United States Patent
He et al.

(10) Patent No.: US 11,146,375 B2
(45) Date of Patent: Oct. 12, 2021

(54) HARQ FEEDBACK CONFIGURATION TECHNIQUES FOR BROADBAND WIRELESS COMMUNICATION NETWORKS

(71) Applicant: APPLE INC., Cupertino, CA (US)

(72) Inventors: Hong He, Beijing (CN); Alexei Davydov, Nizhny Novgorod (RU); Seunghee Han, San Jose, CA (US); Gang Xiong, Beaverton, OR (US); Hwan-Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 660 days.

(21) Appl. No.: 15/751,451

(22) PCT Filed: Dec. 24, 2015

(86) PCT No.: PCT/US2015/000441
§ 371 (c)(1),
(2) Date: Feb. 8, 2018

(87) PCT Pub. No.: WO2017/026979
PCT Pub. Date: Feb. 16, 2017

(65) Prior Publication Data
US 2020/0204328 A1    Jun. 25, 2020

Related U.S. Application Data

(60) Provisional application No. 62/203,673, filed on Aug. 11, 2015.

(51) Int. Cl.
*H04L 5/00* (2006.01)
*H04L 1/18* (2006.01)
*H04W 84/04* (2009.01)

(52) U.S. Cl.
CPC .......... *H04L 5/0055* (2013.01); *H04L 1/1812* (2013.01); *H04W 84/042* (2013.01)

(58) Field of Classification Search
CPC ... H04L 5/0055; H04L 1/1812; H04W 84/042
See application file for complete search history.

(56) References Cited

U.S. PATENT DOCUMENTS 8,995,364 B2 * 3/2015 Kwon ..................... H04L 5/001
370/329
9,083,520 B2 * 7/2015 Lee ........................ H04L 1/0029
(Continued)

FOREIGN PATENT DOCUMENTS

EP        2757727 A2    7/2014
WO    2014-157993 A1    10/2014

OTHER PUBLICATIONS

International Search Report and Written Opinion, dated Apr. 19, 2016, Application No. PCT/US2015/000441, Filed Date: Dec. 24, 2015, pp. 13.

*Primary Examiner* — Michael J Moore, Jr.
(74) *Attorney, Agent, or Firm* — Eschweiler & Potashnik, LLC

(57) ABSTRACT

HARQ feedback configuration techniques for broadband wireless communication networks are described. In one embodiment, for example, an apparatus may comprise a memory and logic for user equipment (UE), at least a portion of the logic implemented in circuitry coupled to the memory, the logic to identify a hybrid automatic repeat request (HARQ) bundling window associated with a received downlink (DL) scheduling command, identify one or more HARQ feedback configuration parameters based on HARQ feedback configuration information comprised in the DL scheduling command, the one or more identified HARQ feedback configuration parameters to include a physical uplink control channel (PUCCH) format for use in transmission of HARQ (Continued)

feedback for the HARQ feedback bundling window, the logic to generate the HARQ feedback for transmission to an evolved node B (eNB) according to the PUCCH format. Other embodiments are described and claimed.

25 Claims, 11 Drawing Sheets

(56) References Cited

U.S. PATENT DOCUMENTS

| | | | |
|---|---|---|---|
| 10,419,178 B2* | 9/2019 | He | H04L 5/0055 |
| 2011/0141878 A1 | 6/2011 | Che et al. | |
| 2013/0114474 A1* | 5/2013 | Fu | H04L 1/1635 370/280 |
| 2013/0114575 A1 | 5/2013 | Fu et al. | |
| 2014/0003302 A1* | 1/2014 | Han | H04W 72/005 370/280 |
| 2014/0192757 A1* | 7/2014 | Lee | H04L 1/1671 370/329 |
| 2014/0269600 A1* | 9/2014 | Lee | H04W 52/48 370/329 |
| 2014/0328260 A1* | 11/2014 | Papasakellariou | H04L 1/1887 370/329 |
| 2015/0016311 A1* | 1/2015 | Han | H04W 28/0289 370/280 |
| 2015/0085714 A1* | 3/2015 | Liang | H04L 1/1614 370/280 |
| 2015/0092624 A1* | 4/2015 | Yao | H04L 5/1461 370/278 |
| 2015/0124670 A1 | 5/2015 | Park | |
| 2015/0173065 A1* | 6/2015 | Fu | H04L 5/1469 370/280 |
| 2016/0211948 A1* | 7/2016 | Tiirola | H04L 1/1671 |
| 2016/0249338 A1* | 8/2016 | Hwang | H04L 5/1469 |
| 2016/0295561 A1* | 10/2016 | Papasakellariou | H04L 5/0094 |
| 2017/0041923 A1* | 2/2017 | Park | H04L 5/0053 |
| 2017/0134144 A1* | 5/2017 | Lunttila | H04L 5/0073 |
| 2017/0251491 A1* | 8/2017 | Qiang | H04L 1/1812 |
| 2018/0145796 A1* | 5/2018 | Liang | H04L 1/1861 |
| 2020/0083980 A1* | 3/2020 | Papasakellariou | H04L 5/0055 |

* cited by examiner

FIG. 8
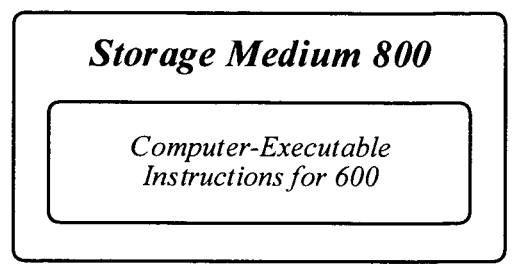
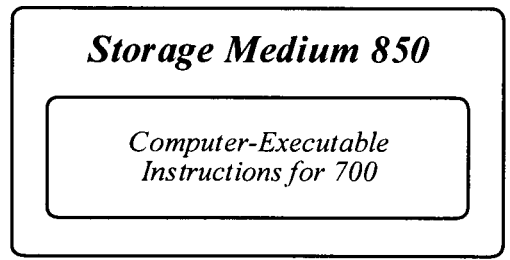

Broadband Wireless Access System 1100

HARQ FEEDBACK CONFIGURATION TECHNIQUES FOR BROADBAND WIRELESS COMMUNICATION NETWORKS

RELATED CASE

This application is a national stage application claiming the benefit of and priority to International Application No. PCT/US2015/000441 entitled "HARQ FEEDBACK CONFIGURATION TECHNIQUES FOR BROADBAND WIRELESS COMMUNICATION NETWORKS" filed Dec. 24, 2015, which claims priority to U.S. Provisional Patent Application No. 62/203,673, filed Aug. 11, 2015, both of which are hereby incorporated by reference in their entirety.

TECHNICAL FIELD

Embodiments herein generally relate to communications between devices in broadband wireless communications networks.

BACKGROUND

In 3rd Generation Partnership Project (3GPP) Long Term Evolution (LTE) Release 10, support was introduced for carrier aggregation (CA) involving aggregation of up to five component carriers of the same frame structure. In view of the ongoing proliferation of LTE-capable devices and the ever-increasing volumes of data that must be accommodated by modern networks, 3GPP is contemplating various potential approaches to increasing data rates. One approach under consideration is an extended CA scheme, according to which up to 32 component carriers may be aggregated in order to support wider spectrum bands at the user equipment (UE) side and boost peak data rate performance.

BRIEF DESCRIPTION OF THE DRAWINGS

FIG. 8 illustrates an embodiment of a storage medium.

DETAILED DESCRIPTION

Figure 1:
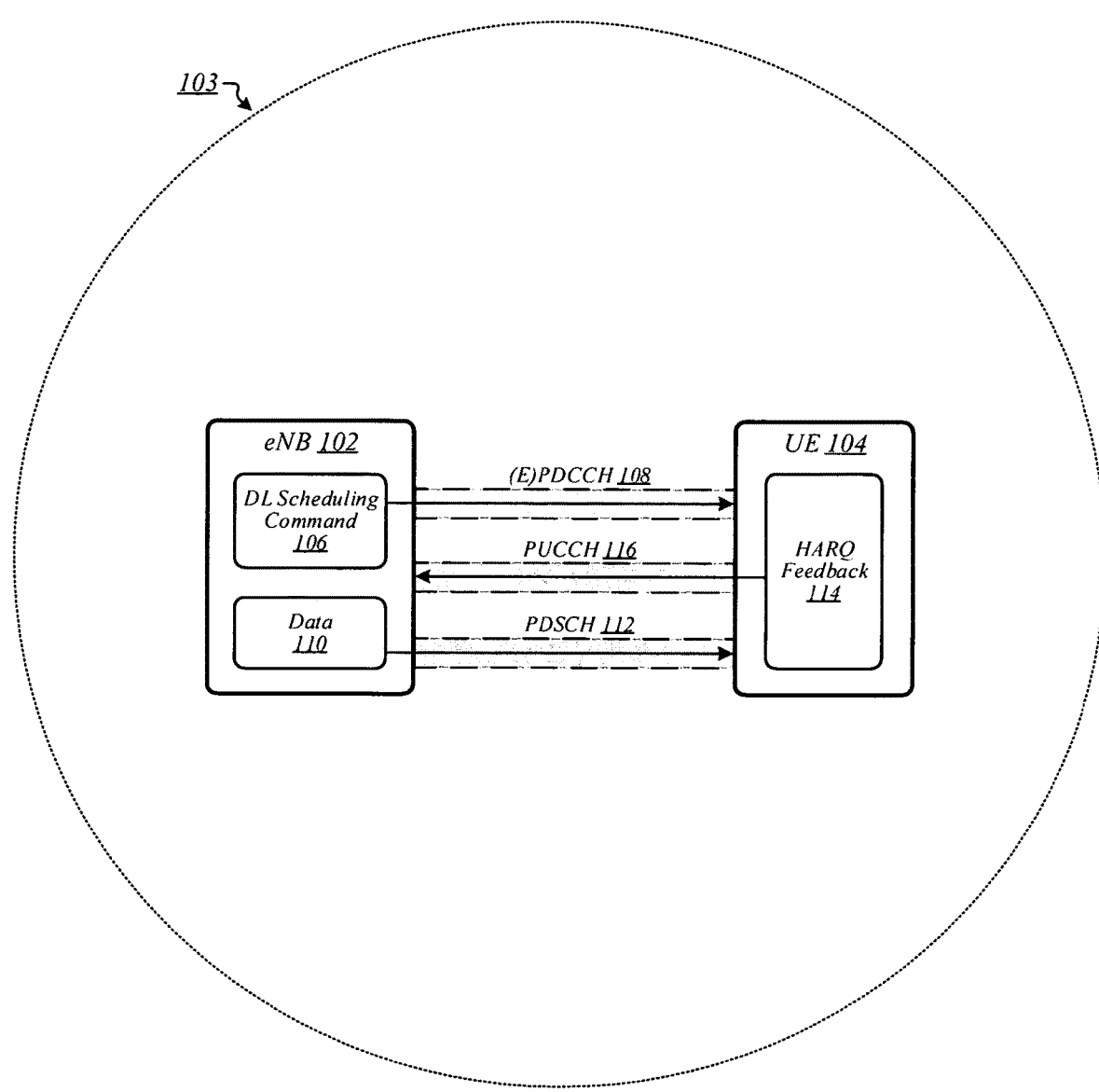
FIG. 1 illustrates an embodiment of a first operating environment.

Various embodiments may be generally directed to HARQ feedback configuration techniques for broadband wireless communication networks. In one embodiment, for example, an apparatus may comprise a memory and logic for user equipment (UE), at least a portion of the logic implemented in circuitry coupled to the memory, the logic to identify a hybrid automatic repeat request (HARQ) bundling window associated with a received downlink (DL) scheduling command, identify one or more HARQ feedback configuration parameters based on HARQ feedback configuration information comprised in the DL scheduling command, the one or more identified HARQ feedback configuration parameters to include a physical uplink control channel (PUCCH) format for use in transmission of HARQ feedback for the HARQ feedback bundling window, the logic to generate the HARQ feedback for transmission to an evolved node B (eNB) according to the PUCCH format. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11 ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. In operating environment 100, an evolved node B (eNB) 102 generally serves a cell 103, and may provide user equipment (UE) 104 with wireless connectivity via a wireless carrier of cell 103. During ongoing operation, eNB 102 may identify data 110 to be transmitted to UE 104. In some embodiments, eNB 102 may schedule transmission of data 110 for an upcoming subframe, which may be referred to as the "transmit subframe" for data 110. In various embodiments, in order to notify UE 104 of the upcoming transmission, eNB 102 may send a downlink (DL) scheduling command 106 to UE 104 over a physical downlink control channel (PDCCH) or enhanced physical downlink control channel (EPDCCH), collectively depicted in FIG. 1 as (E)PDCCH 108. In some embodiments, eNB 102 may then transmit data 110 to UE 104 over a physical downlink shared channel (PDSCH) 112 during the transmit subframe for data 110. In various embodiments, in response to receipt of DL scheduling command 106, UE 104 may identify the transmit subframe of data 110 and access one or more resources of PDSCH 112 during that transmit subframe to receive data 110.

In some embodiments, in order to confirm successful receipt of data 110—or to report non-receipt of some or all of data 110—UE 104 may generate HARQ feedback 114. In various embodiments, UE 104 may transmit HARQ feedback 114 to eNB 102 over a physical uplink control channel (PUCCH) 116. More particularly, in some embodiments, UE 104 may transmit HARQ feedback 114 to eNB 102 using a particular PUCCH resource of PUCCH 116 and according to a particular PUCCH format.

In various embodiments, UE 104 may be configured to use HARQ feedback 114 to provide feedback for one or more other DL data transmissions in addition to that of data 110. In some embodiments, UE 104 may be configured to use HARQ feedback 114 to provide feedback for one or more DL data transmissions occurring during a different subframe (or set of different subframes) than that during which the DL transmission of data 110 occurs. In various embodiments, UE 104 may be configured to use HARQ feedback 114 to provide feedback for one or more DL data transmissions performed using a different carrier (or set of different carriers) than that used for the DL transmission of data 110. In some embodiments, UE 104 may be configured to use HARQ feedback 114 to provide feedback for DL data transmissions of multiple subframes and multiple carriers. For example, in various embodiments, carrier aggregation may be used to enable DL data transmission to UE 104 via each of a set of aggregated component carriers, and UE 104 may be configured to use HARQ feedback 114 to provide feedback for DL transmissions collectively performed during multiple subframes using multiple such component carriers. In some such embodiments, cell 103 may comprise a primary cell (PCell) with respect to wireless communications with/by UE 104. The embodiments are not limited in this context.

In various embodiments, UE 104 may select the PUCCH format that it uses for transmission of HARQ feedback 114 based on the size of HARQ feedback 114, which in turn may depend on the amount of transmitted DL data for which feedback is being provided. For example, in some embodiments, UE 104 may use one of relatively compact PUCCH formats 1a or 1b if HARQ feedback 114 merely includes feedback for DL data transmission of a single subframe and single carrier, and may use the larger PUCCH format 3 if HARQ feedback 114 includes feedback for DL data transmissions of multiple subframes and/or multiple component carriers.

In various embodiments, an enhanced carrier aggregation scheme may be implemented to enable DL data transmission to UE 104 via any or all of a larger number of component carriers than are aggregated according to conventional techniques. For example, in some embodiments, an enhanced carrier aggregation scheme may be implemented to enable DL data transmission to UE 104 via up to 32 component carriers, rather than limiting such transmissions to a maximum of five component carriers in accordance with conventional LTE carrier aggregation protocols. In various such embodiments, conventional PUCCH formats may not be large enough to accommodate the potential amounts of HARQ feedback that may need to be transmitted at one time. For example, while PUCCH format 3 may be used to accommodate up to 21 bits of HARQ feedback, the provision of HARQ feedback for respective DL data transmissions over each of 32 component carriers may require 64 bits if cell 103 is a frequency division duplexing (FDD) cell, and potentially 128 bits or more if cell 103 is a time division duplexing (TDD) cell.

In some embodiments, in order to accommodate the larger amounts of HARQ feedback that may need to be conveyed in conjunction with such an enhanced carrier aggregation scheme, an enhanced PUCCH format may be implemented. For example, in various embodiments, an enhanced PUCCH format may be implemented that may be used to transmit up to 128 bits of HARQ feedback. However, if the enhanced PUCCH format is used for all transmissions of aggregated HARQ feedback, significant amounts of PUCCH resources may be wasted. For example, if an enhanced PUCCH format designed to accommodate a 128-bit HARQ feedback payload is used to transmit 10 bits of HARQ feedback, the majority of the resources consumed by the PUCCH transmission may be wasted. The embodiments are not limited to this example.

Disclosed herein are HARQ feedback configuration techniques for broadband wireless networks. According to some such techniques, an eNB such as eNB 102 may include HARQ feedback configuration information in a DL scheduling command in order to specify one or more HARQ feedback configuration parameters. In various embodiments, the one or more HARQ feedback configuration parameters may include a PUCCH format to be used for HARQ feedback transmission. In some embodiments, the one or more HARQ feedback configuration parameters may include a PUCCH resource to be used for HARQ feedback transmission. In various embodiments, the one or more HARQ feedback configuration parameters may include a HARQ feedback payload size. The embodiments are not limited in this context.

Figure 2:
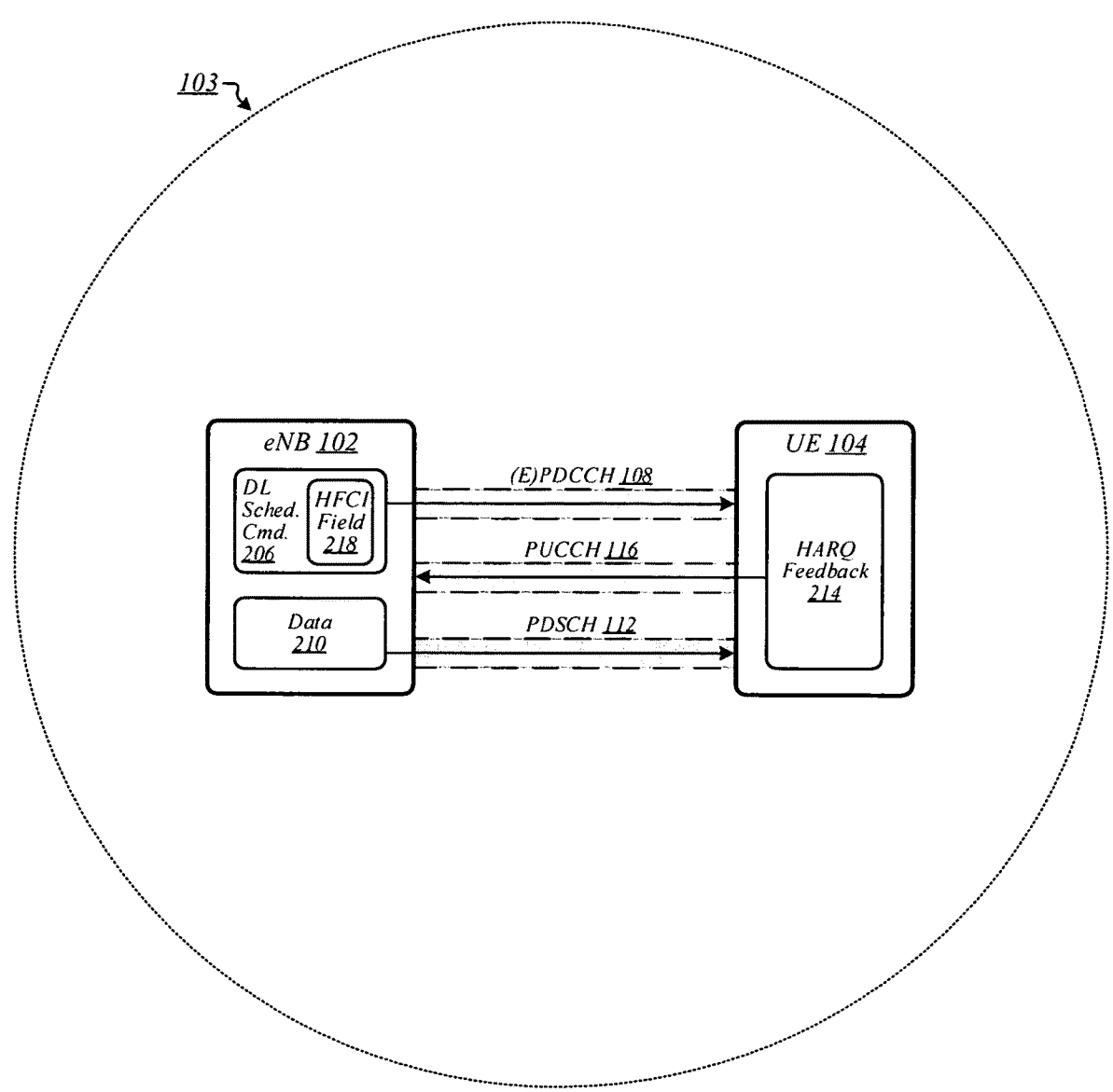
FIG. 2 illustrates an embodiment of a second operating environment.

FIG. 2 illustrates an example of an operating environment 200 that may be representative of the implementation of one or more of the disclosed HARQ feedback configuration techniques according to some embodiments. In operating environment 200, eNB 102 may send a DL scheduling command 206 to UE 104 over (E)PDCCH 108 in order to notify UE 104 of an upcoming transmission of data 210 to UE 104 over PDSCH 112. In response to receipt of DL scheduling command 206, UE 104 may monitor the appropriate resource(s) of PDSCH 112 during the transmit subframe for data 210. UE 104 may then include HARQ feedback for data 210 in HARQ feedback 214 that it transmits over PUCCH 116 to eNB 102.

In various embodiments, in addition to feedback for data 210, HARQ feedback 214 may include feedback for one or more other DL data transmissions to UE 104. In some embodiments, HARQ feedback 214 may include respective feedback for DL data transmissions to UE 104 over each of multiple component carriers. In various embodiments, PDSCH 112 may comprise a PDSCH of one of a plurality of aggregated component carriers, and HARQ feedback 214 may include feedback for DL data transmissions to UE 104 over respective PDSCHs of one or more other component carriers comprised among the plurality of aggregated component carriers. In some embodiments, HARQ feedback 214 may include respective feedback for DL data transmissions to UE 104 during each of multiple subframes. In various embodiments, for example, during a given UL subframe, UE 104 may need to provide HARQ feedback for each of a set of multiple DL subframes, and HARQ feedback 214 may comprise the respective HARQ feedback for each such DL subframe. Hereinafter, the term "HARQ feedback bundling window" shall be employed to denote such a set of multiple DL subframes.

In some embodiments, DL scheduling command 206 may comprise HARQ feedback configuration information (HFCI) field 218. In various embodiments, HFCI field 218 may comprise a one-bit field. In some embodiments, HFCI field 218 may only be permitted to be present in DL scheduling commands that map onto UE-specific (E)PDCCH search spaces corresponding to the cell radio network temporary identifiers (C-RNTIs) to which they are addressed. In various embodiments, eNB 102 may construct DL scheduling command 206 according to a particular defined DL control information (DCI) format. In some embodiments, that DCI format may comprise an enhanced version of a conventional DCI format. In various embodiments, for example, enhanced versions of one or more of DCI formats 1, 1A, 1B, 1D, 2, 2A, 2B, 2C, and 2D may be defined that include HFCI field 218, and eNB 102 may construct DL scheduling command 206 in accordance with one such enhanced DCI format. The embodiments are not limited in this context.

In some embodiments, eNB 102 may use HFCI field 218 to indicate a PUCCH format that UE 104 should use in transmitting HARQ feedback 214 over PUCCH 116 to eNB 102. In various such embodiments, eNB 102 may select the value of HFCI field 218 based on the value-to-parameter correspondences illustrated in Table 1 below. In such embodiments, eNB 102 may set HFCI field 218 to '0' in order to indicate that UE 104 should use a first PUCCH format in transmitting HARQ feedback 214, or may set HFCI field 218 to '1' in order to indicate that UE 104 should use a second PUCCH format in transmitting HARQ feedback 214. In some embodiments, the first and second PUCCH formats may include a conventional PUCCH format and an enhanced PUCCH format designed to accommodate larger HARQ feedback payloads. For example, in various embodiments, eNB 102 may set the value of HFCI field 218 to '1' in order to indicate that such an enhanced PUCCH format is to be used, or may set the value of HFCI field 218 to '0' in order to indicate that PUCCH format 3 is to be used. In some other embodiments, both of the two PUCCH formats may comprised enhanced PUCCH formats. The embodiments are not limited in this context.

TABLE 1

| Bit in HFCI Field 218 | Corresponding HARQ Feedback Configuration Parameter |
|---|---|
| '0' | The $1^{st}$ PUCCH format configured by the higher layers or fixed in specification |
| '1' | The $2^{nd}$ PUCCH format configured by the higher layers or fixed in specification |

In various embodiments, based on HFCI field 218, UE 104 may identify a PUCCH format according to which to transmit HARQ feedback 214 over PUCCH 116 to eNB 102. In some embodiments, based on the identified PUCCH format, UE 104 may identify a PUCCH resource to be used in transmitting HARQ feedback 214 over PUCCH 116 to eNB 102. In various embodiments, UE 104 may identify the PUCCH resource as one of four PUCCH resources associated with the PUCCH format according to higher-layer configuration. In some such embodiments, UE 104 may identify the PUCCH resource based on the value of a transmit power control (TPC) field comprised in a DL scheduling command—which may or may not be DL scheduling command 206—that is associated with a DL data transmission for which HARQ feedback 214 includes feedback and that contains a DL assignment index (DAI) value that is greater than 1. The embodiments are not limited in this context.

In various embodiments, after identifying the PUCCH format according to which HARQ feedback 214 is to be transmitted over PUCCH 116 to eNB 102, UE 104 may determine a HARQ payload size $O^{ACK}$ for HARQ feedback 214 based on the identified PUCCH format. In some embodiments, particular respective HARQ payload sizes for use in conjunction with the first and second PUCCH formats may be predefined, or may be configured by higher layer signaling. In various embodiments, for example, $O^{ACK}$ may be predefined or configured by higher layers to be equal to 21 when PUCCH format 3 is being used, and may be predefined or configured by higher layers to be equal to 64 or 128 when an enhanced PUCCH format designed to accommodate larger HARQ feedback payloads is being used. The embodiments are not limited to this example.

In some embodiments, once it determines $O^{ACK}$, UE 104 may construct HARQ feedback 214 as a sequence of $O^{ACK}$ bits $O_0^{ACK}$, $O_1^{ACK}$, . . . , $O_{O^{ACK}-1}^{ACK}$. In various embodiments, in generating HARQ feedback 214 for a plurality of DL data transmissions of a HARQ feedback bundling window, UE 104 may order the bits $O_0^{ACK}$, $O_1^{ACK}$, . . . , $O_{O^{ACK}-1}^{ACK}$ according to the values of DAI fields comprised in the DL scheduling commands corresponding to those DL data transmissions. In some embodiments, the HARQ feedback for a PDSCH transmission with a corresponding PDCCH/EPDCCH transmission or for a PDCCH/EPDCCH indicating downlink semi-persistent scheduling (SPS) release in a subframe n-k may be associated with $O_{DAI(k)-1}^{ACK}$ if a configured transmission mode supports one transport block or spatial HARQ feedback bundling is applied, and otherwise may be associated with $O_{2DAI(k)-2}^{ACK}$ and $O_{2DAI(k)-1}^{ACK}$, where DAI(k) represents the value of the DAI field in a detected DL scheduling command of DCI format 1, 1A, 1B, 1D, 2, 2A, 2B, 2C, or 2D detected in the HARQ feedback bundling window, and $O_{2DAI(k)-2}^{ACK}$ and $O_{2DAI(k)-1}^{ACK}$ represent HARQ feedback for codewords 0 and 1, respectively. In various embodiments in which $N_{SPS}>0$, HARQ feedback for a PDSCH transmission for which there is no corresponding PDCCH/EPDCCH transmission may be mapped to $O_{O^{ACK}-1}^{ACK}$. In some embodiments, HARQ feedback bits that correspond to PDCCH/EPDCCH transmissions without any detected corresponding PDSCH transmissions or correspond to non-detected PDCCH/EPDCCH downlink SPS release indications may be set to NACK. The embodiments are not limited in this context.

Figure 3:
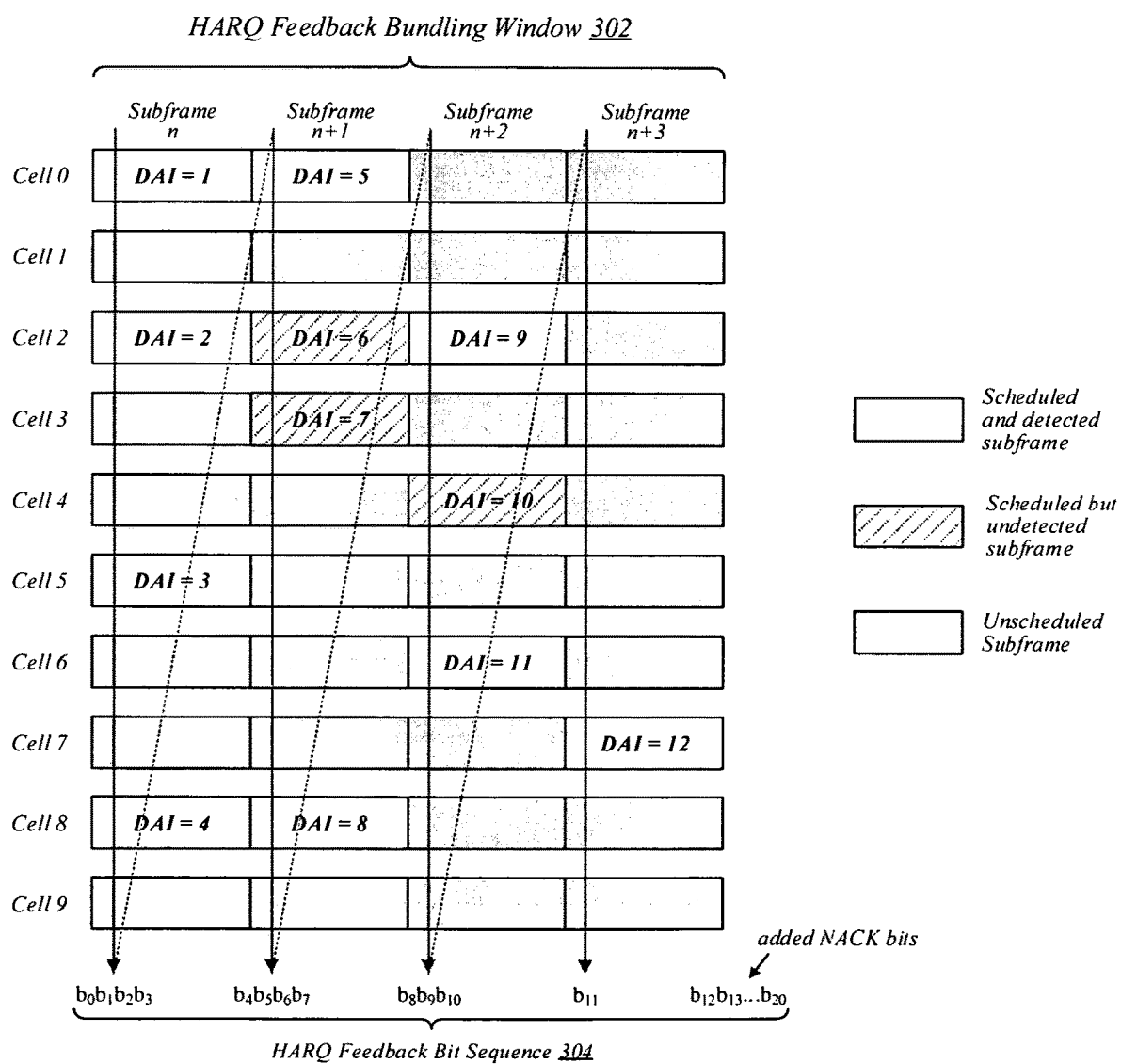
FIG. 3 illustrates an embodiment of a first feedback generation process.

FIG. 3 illustrates an example of a HARQ feedback generation process 300 that may be representative of the implementation of one or more of the disclosed HARQ feedback configuration techniques according to various embodiments. For example, HARQ feedback generation process 300 may be representative of a HARQ feedback generation process that UE 104 may use to generate HARQ feedback 214 following a determination that HARQ feedback 214 is to be transmitted using PUCCH format 3 and a determination that HARQ feedback 214 is to comprise 21 bits. According to HARQ feedback generation process 300, for a UE configured with an aggregated set of ten component carriers—each corresponding to a respective one of cells 0 to 9—a HARQ feedback bit sequence 304 may be generated for a HARQ feedback bundling window 302. In this example, HARQ feedback bundling window 302 comprises a series of four subframes: subframe n, subframe n+1, subframe n+2, and subframe n+3. The embodiments are not limited to this example.

According to HARQ feedback generation process 300, construction of HARQ feedback bit sequence 304 proceeds on a subframe-by-subframe basis, and within each subframe, on a cell-by-cell basis. For each subframe, any cells for which previously received DL scheduling commands had indicated scheduled DL data transmissions may be identified, and for each such cell, a respective HARQ feedback bit may be generated to indicate whether the scheduled DL data transmission was successfully received. For example, cells 0, 2, 5, and 8 may be identified as cells from which DL data transmissions were expected during subframe n, and HARQ feedback bits $b_0$, $b_1$, $b_2$, and $b_3$ may be generated to indicate whether the scheduled DL data transmissions were successfully received from respective cells 0, 2, 5, and 8 during subframe n.

In order to account for the possibility of some DL scheduling commands pertaining to HARQ feedback bundling window 302 having been missed, DAI values comprised in received DL scheduling commands pertaining to HARQ feedback bundling window 302 may be analyzed. According to HARQ feedback generation process 300, when discontinuities are detected in such DAI values, HARQ feedback bits may be generated for DL data transmissions of which the UE had been unaware. In the example depicted in FIG. 3, DL scheduling commands corresponding to DL data transmissions of cells 2 and 3 during subframe n+1 may have been missed. However, based on respective DAI values of 5 and 8 comprised in DL scheduling commands corresponding to DL data transmissions of cells 0 and 8 during subframe n+1, it may be concluded that DL scheduling commands were missed for DL data transmissions of two of cells 1 to 7 during subframe n+1. Thus, HARQ feedback bits $b_4$, $b_5$, $b_6$, and $b_7$ may be generated for subframe n+1. Bits $b_4$ and $b_7$ may be set to indicate whether DL data transmissions were successfully received from respective cells 0 and 8 during subframe n+1, and bits $b_5$ and $b_6$ may be set to NACKs.

Similarly, for subframe n+2, HARQ feedback bits $b_8$, $b_9$, and $b_{10}$ may be generated. Bits $b_8$ and $b_{10}$ may be set to indicate whether DL data transmissions were successfully received from respective cells 2 and 6 during subframe n+2, and bit $b_9$ may be set to a NACK based on detection of a missed DL scheduling command, which in this example was a DL scheduling command for a DL data transmission of cell 4. For subframe n+3, a HARQ feedback bit $b_{11}$ may be generated and set to indicate whether a DL data transmission was successfully received from cell 7 during subframe n+3. Following the generation of HARQ feedback bits $b_0$ to $b_{11}$, in accordance with a determination that HARQ feedback bit sequence 304 is to comprise 21 bits, nine additional bits $b_{12}$ to $b_{20}$ may be generated and set to NACKs. Finally, HARQ feedback bit sequence 304 may be generated by concatenating HARQ feedback bits $b_0$ to $b_{20}$ to obtain a bit sequence of 21 bits. The embodiments are not limited to this example.

Figure 4:
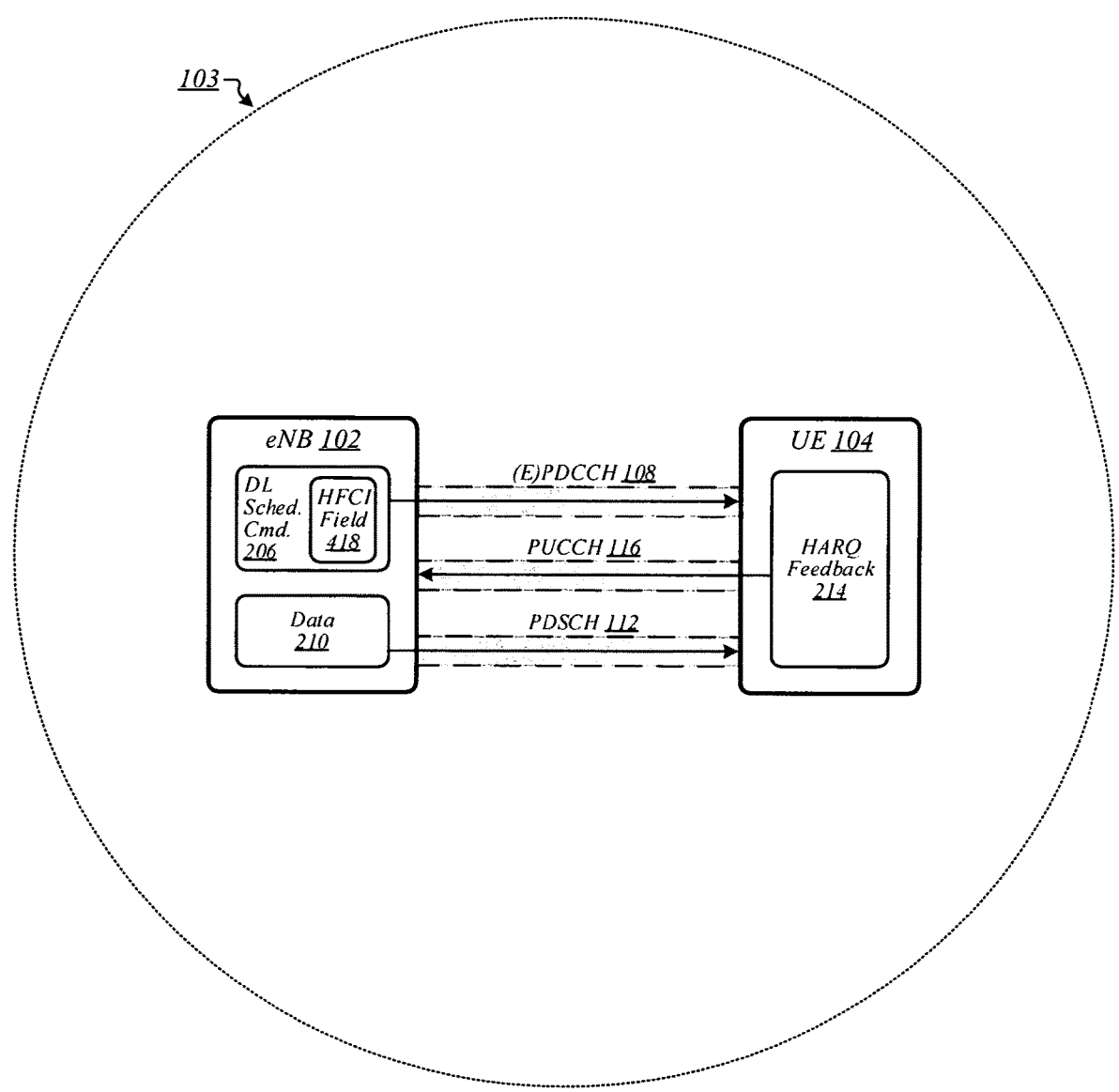
FIG. 4 illustrates an embodiment of a third operating environment.

FIG. 4 illustrates an example of an operating environment 400 that may be representative of some embodiments. In operating environment 400, as in operating environment 200 of FIG. 2, UE 104 may receive DL scheduling command 206 and generate HARQ feedback 214. However, in operating environment 400, DL scheduling command 206 may comprise a multi-bit HFCI field 418. In various embodiments, eNB 102 may use multi-bit HFCI field 418 to specify multiple HARQ feedback configuration parameters In some embodiments, HFCI field 418 may only be permitted to be present in DL scheduling commands that map onto UE-specific (E)PDCCH search spaces corresponding to the cell radio network temporary identifiers (C-RNTIs) to which they are addressed. In various embodiments, enhanced versions of one or more of DCI formats 1, 1A, 1B, 1D, 2, 2A, 2B, 2C, and 2D may be defined that include multi-bit HFCI field 418, and eNB 102 may construct DL scheduling command 206 in accordance with one such enhanced DCI format. The embodiments are not limited in this context.

Table 2 illustrates a first example of a value-to-parameter mapping that may be defined in some embodiments for a two-bit HFCI field 418. According to the value-to-parameter mapping illustrated in Table 2, eNB 102 may use HFCI field 418 to indicate both a PUCCH format and a PUCCH resource that UE 104 should use in transmitting HARQ feedback 214 over PUCCH 116 to eNB 102. Namely, eNB 102 may set HFCI field 418 to '00' to indicate a first PUCCH format and a first PUCCH resource, may set HFCI field 418 to '01' to indicate the first PUCCH format and a second PUCCH resource, may set HFCI field 418 to '10' to indicate a second PUCCH format and the first PUCCH resource, or may set HFCI field 418 to '11' to indicate the second PUCCH format and the second PUCCH resource.

TABLE 2

| Bits in HFCI Field 418 | Corresponding HARQ Feedback Configuration Parameters |
|---|---|
| '00' | The $1^{st}$ PUCCH format with the 1st PUCCH resource value configured by the higher layers |
| '01' | The $1^{st}$ PUCCH format with $2^{nd}$ PUCCH resource value configured by the higher layers |
| '10' | The $2^{nd}$ PUCCH format with the $1^{st}$ PUCCH resource value configured by the higher layers |
| '11' | The $2^{nd}$ PUCCH format with the $2^{nd}$ PUCCH resource value configured by the higher layers |

Table 3 illustrates a second example of a value-to-parameter mapping that may be defined in various embodiments for a two-bit HFCI field 418. Like the mapping illustrated in Table 2, the mapping illustrated in Table 3 may enable eNB 102 to use HFCI field 418 to indicate both a PUCCH format and a PUCCH resource that UE 104 should use in transmitting HARQ feedback 214 over PUCCH 116 to eNB 102. However, the value-to-parameter mapping illustrated in Table 3 may enable eNB 102 to select a PUCCH resource for use with PUCCH format 2 from among three candidate values rather than two. According to the value-to-parameter mapping illustrated in Table 3, eNB 102 may set HFCI field 418 to '00' to indicate a first PUCCH format and a first PUCCH resource, may set HFCI field 418 to '01' to indicate a second PUCCH format and the first PUCCH resource, may set HFCI field 418 to '10' to indicate the second PUCCH format and a second PUCCH resource, or may set HFCI field 418 to '11' to indicate the second PUCCH format and a third PUCCH resource.

TABLE 3

| Bits in HFCI Field 418 | Corresponding HARQ Feedback Configuration Parameters |
|---|---|
| '00' | The $1^{st}$ PUCCH format with the 1st PUCCH resource value configured by the higher layers |
| '01' | The $2^{nd}$ PUCCH format with the $1^{st}$ PUCCH resource value configured by the higher layers |
| '10' | The $2^{nd}$ PUCCH format with the $2^{nd}$ PUCCH resource value configured by the higher layers |
| '11' | The $2^{nd}$ PUCCH format with the $3^{rd}$ PUCCH resource value configured by the higher layers |

In some embodiments, respective corresponding HARQ feedback payload sizes may be predefined or configured by higher-layer signaling for the first and second PUCCH formats in conjunction with the use of a two-bit HFCI field 418 according to the value-to-parameter mapping of Table 2 or Table 3. In various embodiments, for example, a 21-bit HARQ feedback payload size may be predefined for the first PUCCH format and a 128-bit HARQ feedback payload size may be predefined for the second PUCCH format. In some embodiments, the first PUCCH format may comprise PUCCH format 3 and the second PUCCH format may comprise an enhanced PUCCH format designed to accommodate larger HARQ feedback payloads. In various embodiments, the second PUCCH format may comprise a physical uplink shared channel (PUSCH)-based PUCCH format. The embodiments are not limited in this context.

Table 4 illustrates a third example of a value-to-parameter mapping that may be defined in some embodiments for a two-bit HFCI field 418. According to the value-to-parameter mapping illustrated in Table 4, eNB 102 may use HFCI field 418 to indicate a PUCCH format and either a PUCCH resource or a HARQ feedback payload size. Namely, eNB 102 may set HFCI field 418 to '00' to indicate a first PUCCH format and a first PUCCH resource, may set HFCI field 418 to '01' to indicate the first PUCCH format and a second PUCCH resource, may set HFCI field 418 to '10' to indicate a second PUCCH format and a first HARQ feedback payload size, and may set HFCI field 418 to '11' to indicate the second PUCCH format and a second HARQ feedback payload size.

TABLE 4

| Bits in HFCI Field 418 | Corresponding HARQ Feedback Configuration Parameters |
|---|---|
| '00' | The $1^{st}$ PUCCH format with the 1st PUCCH resource value configured by the higher layers |
| '01' | The $1^{st}$ PUCCH format with $2^{nd}$ PUCCH resource value configured by the higher layers |
| '10' | The $2^{nd}$ PUCCH format with the $1^{st}$ HARQ-ACK codebook size |
| '11' | The $2^{nd}$ PUCCH format with the $2^{nd}$ HARQ-ACK codebook size |

In various embodiments, the first PUCCH format corresponding to respective HFCI field 418 values of '00' and '01' according to the value-to-parameter mapping of Table 4 may comprise PUCCH format 3. In some embodiments, the second PUCCH format corresponding to respective HFCI field 418 values of '10' and '11' according to the value-to-parameter mapping of Table 4 may comprise an enhanced PUCCH format designed to accommodate larger HARQ feedback payloads. In various such embodiments, the first and second HARQ feedback payload sizes corresponding to respective HFCI field 418 values of '10' and '11' according to the value-Jo to-parameter mapping of Table 4 may both be comprised among a set of HARQ feedback payload sizes designated for use in conjunction with the enhanced PUCCH format. In some embodiments, for example, the first and second HARQ feedback payload size may comprise two different numbers of bits comprised among the set {32 bits, 64 bits, 128 bits}. In various embodiments, HARQ feedback payload sizes to which HFCI field 418 values of '10' and '11' may be used to refer may be defined to differ between TDD environments and FDD environments. In an example embodiment, in the context of a TDD PUCCH, HFCI field 418 values of '10' and '11' may indicate 64-bit and 128-bit HARQ feedback payload sizes, respectively. In the same example embodiment, in the context of an FDD PUCCH, HFCI field 418 values of '10' and '11' may indicate 32-bit and 64-bit HARQ feedback payload sizes, respectively. The embodiments are not limited to this example.

Table 5 illustrates a fourth example of a value-to-parameter mapping that may be defined in some embodiments for a two-bit HFCI field 418. Like the mapping illustrated in Table 4, the mapping illustrated in Table 5 may enable eNB 102 to use HFCI field 418 to indicate a PUCCH format and either a PUCCH resource or a HARQ feedback payload size. However, the value-to-parameter mapping illustrated in Table 5 may enable eNB 102 to select a HARQ feedback payload size for use with PUCCH format 2 from among three candidate sizes rather than two. According to the mapping illustrated in Table 5, eNB 102 may set HFCI field 418 to '00' to indicate a first PUCCH format and a first PUCCH resource, may set HFCI field 418 to '01' to indicate a second PUCCH format and a first HARQ feedback payload size, may set HFCI field 418 to '10' to indicate the second PUCCH format and a second HARQ feedback payload size, and may set HFCI field 418 to '11' to indicate the second PUCCH format and a third HARQ feedback payload size.

TABLE 5

| Bits in HFCI Field 418 | Corresponding HARQ Feedback Configuration Parameters |
|---|---|
| '00' | The $1^{st}$ PUCCH format with the 1st PUCCH resource value configured by the higher layers |
| '01' | The $2^{nd}$ PUCCH format with the $1^{st}$ HARQ-ACK codebook size |
| '10' | The $2^{nd}$ PUCCH format with the $2^{nd}$ HARQ-ACK codebook size |
| '11' | The $2^{nd}$ PUCCH format with the $3^{rd}$ HARQ-ACK codebook size |

In various embodiments, in conjunction with the use of a two-bit HFCI field 418 according to the value-to-parameter mapping of Table 4 or Table 5, a particular HARQ feedback payload size to be used in combination with the first PUCCH format may be predefined or configured by higher-layer signaling. For example, in some embodiments, a HARQ feedback payload size of 21 bits may be predefined or configured by higher-layer signaling for use with the first PUCCH format, which may comprise PUCCH format 3. In various embodiments, in conjunction with the use of a two-bit HFCI field 418 according to the value-to-parameter mapping of Table 4 or Table 5, a particular PUCCH resource to be used in combination with the second PUCCH format may be predefined or configured by higher-layer signaling. The embodiments are not limited in this context.

Table 6 illustrates a fifth example of a value-to-parameter mapping that may be defined in some embodiments for a two-bit HFCI field 418. According to the value-to-parameter mapping illustrated in Table 6, eNB 102 may use HFCI field 418 to indicate a PUCCH format and one or both of a PUCCH resource and a HARQ feedback payload size. Namely, eNB 102 may set HFCI field 418 to '00' to indicate a first PUCCH format and a first PUCCH resource, may set HFCI field 418 to '01' to indicate a second PUCCH format, the first PUCCH resource, and a first HARQ feedback payload size, may set HFCI field 418 to '10' to indicate the second PUCCH format, a second PUCCH resource, and the first HARQ feedback payload size, or may set HFCI field 418 to '11' to indicate the second PUCCH format and a second HARQ feedback payload size.

TABLE 6

| Bits in HFCI Field 418 | Corresponding HARQ Feedback Configuration Parameters |
|---|---|
| '00' | The $1^{st}$ PUCCH format with the 1st PUCCH resource value configured by the higher layers |
| '01' | The $2^{nd}$ PUCCH format with the $1^{st}$ HARQ-ACK codebook size, $1^{st}$ PUCCH resource value configured by the higher layers |
| '10' | The $2^{nd}$ PUCCH format with the $1^{st}$ HARQ-ACK codebook size, $2^{nd}$ PUCCH resource value configured by the higher layers |
| '11' | The $2^{nd}$ PUCCH format with the $2^{nd}$ HARQ-ACK codebook size |

In various embodiments, in conjunction with the use of a two-bit HFCI field 418 according to the value-to-parameter mapping of Table 6, a particular HARQ feedback payload size to be used in combination with the first PUCCH format and the first PUCCH resource may be predefined or configured by higher-layer signaling. In some embodiments, in conjunction with the use of a two-bit HFCI field 418 according to the value-to-parameter mapping of Table 6, a particular PUCCH resource to be used in combination with the second PUCCH format and the second HARQ feedback payload size may be predefined or configured by higher-layer signaling. The embodiments are not limited in this context.

Table 7 illustrates a sixth example of a value-to-parameter mapping that may be defined in various embodiments for a two-bit HFCI field 418. According to the value-to-parameter mapping illustrated in Table 7, eNB 102 may use HFCI field 418 to indicate a PUCCH format and a PUCCH resource, and possibly a HARQ feedback payload size as well. Namely, eNB 102 may set HFCI field 418 to '00' to indicate a first PUCCH format and a first PUCCH resource, may set HFCI field 418 to '01' to indicate a second PUCCH format, the first PUCCH resource, and a first HARQ feedback payload size, may set HFCI field 418 to '10' to indicate the second PUCCH format, a second PUCCH resource, and a second HARQ feedback payload size, or may set HFCI field 418 to '11' to indicate the second PUCCH format, a third PUCCH resource, and a third HARQ feedback payload size. In some embodiments, in conjunction with the use of a two-bit HFCI field 418 according to the value-to-parameter mapping of Table 7, a particular HARQ feedback payload size to be used in combination with the first PUCCH format and the first PUCCH resource may be predefined or configured by higher-layer signaling. The embodiments are not limited in this context.

TABLE 7

| Bits in HFCI Field 418 | Corresponding HARQ Feedback Configuration Parameters |
|---|---|
| '00' | The $1^{st}$ PUCCH format with the 1st PUCCH resource value configured by the higher layers |
| '01' | The $2^{nd}$ PUCCH format with the $1^{st}$ HARQ-ACK codebook size, $1^{st}$ PUCCH resource value configured by the higher layers |
| '10' | The $2^{nd}$ PUCCH format with the $2^{nd}$ HARQ-ACK codebook size, $2^{nd}$ PUCCH resource value configured by the higher layers |
| '11' | The $2^{nd}$ PUCCH format with the $3^{rd}$ HARQ-ACK codebook size, $3^{rd}$ PUCCH resource value configured by higher layers. |

It is to be appreciated that although Tables 2 to 7 illustrate various examples of value-to-parameter mappings that may be defined for an HFCI field 418 comprising two bits, an HFCI field 418 comprising more than two bits may be implemented in various embodiments. Table 8 illustrates an example of a value-to-parameter mapping that may be defined in some embodiments for an X-bit HFCI field 418, where X>2.

TABLE 8

| Decimal Value of Bit String in X-Bit HFCI Field 418 | W |
|---|---|
| 0 | 1 |
| 1 | 2 |
| 2 | 3 |
| ... | ... |
| $2^x - 1$ | $2^x$ |

According to the value-to-parameter mapping illustrated in Table 8, eNB 102 may use an X-bit HFCI field 418 to indicate a value of a parameter W. More particularly, in this example, eNB 102 may use the X-bit HFCI field 418 to identify an integer in the inclusive range $[1, 2^X]$ as the value of W. In various embodiments, following receipt of DL scheduling command 206, UE 104 may identify the value of W based on the contents of HFCI field 418 and may then identify—based on the value of W—a HARQ feedback payload size to be used in transmitting HARQ feedback 214 over PUCCH 116 to eNB 102. In some such embodiments, UE 104 may use W to identify such a HARQ feedback payload size $O^{ACK}$ according to Equation (1) as follows:

$$O^{ACK} = W + 2^X \lceil (U-W)/2^X \rceil \quad (1)$$

where U denotes a total number of PDSCH transmissions and PDCCH downlink SPS release indications received during a HARQ feedback bundling window. In various embodiments, based on an $O^{ACK}$ value determined in such fashion, UE 104 may determine one or both of a PUCCH format and a PUCCH resource for use in transmitting HARQ feedback 214 over PUCCH 116 to eNB 102. In some embodiments, for example, UE 104 may transmit HARQ feedback 214 using a first PUCCH format and a corresponding first PUCCH resource if $O^{ACK} \leq 21$, and may transmit HARQ feedback 214 using a second PUCCH format and a corresponding second PUCCH resource if $O^{ACK} > 21$. In various such embodiments, the first PUCCH format may comprise PUCCH format 3, and the second PUCCH format may comprise an enhanced PUCCH format designed to accommodate larger HARQ feedback payloads. The embodiments are not limited in this context.

Table 9 illustrates a more generalized form of a value-to-parameter mapping that may be defined in some embodiments for X-bit HFCI field 418. According to the value-to-parameter mapping illustrated in Table 9, each of $2^X-1$ possible values of d—where d represents a decimal value of a bit string of X bits contained in HFCI field 418—is defined to indicate a particular respective set of HARQ feedback configuration parameters $\{F_d, O^{ACK_d}, R_d\}$. For any given value of d, $F_d$ may comprise a PUCCH format indicated by that value of d, $O^{ACK_d}$ may comprise a HARQ feedback payload size indicated by that value of d, and $R_d$ may comprise a PUCCH resource indicated by that value of d.

TABLE 9

| Decimal Value d of Bit String in X-Bit HFCI Field 418 | PUCCH Format | HARQ Feedback Payload Size | PUCCH Resource |
|---|---|---|---|
| 0 | $F_0$ | $O^{ACK_0}$ | $R_0$ |
| 1 | $F_1$ | $O^{ACK_1}$ | $R_1$ |
| ... | ... | ... | ... |
| $2^X - 1$ | $F_{2^X-1}$ | $O^{ACK_{2^X-1}}$ | $R_{2^X-1}$ |

It is to be appreciated that in various embodiments, some or all of these three parameters may be the same for multiple given values of d. Table 10 illustrates an example of such an embodiment. In the example illustrated in Table 10, HFCI field 418 comprises 3 bits, and thus X is equal to three. $F_0$ and $F_1$ both correspond to PUCCH format 3, while $F_2$ to $F_7$ all correspond to an enhanced PUCCH format designed to accommodate larger HARQ feedback payloads. $O^{ACK_0}$ and $O^{ACK_1}$ both correspond to a 21-bit HARQ feedback payload size, $O^{ACK_2}$, $O^{ACK_3}$ and $O^{ACK_4}$ each correspond to a 64-bit HARQ feedback payload size, and $O^{ACK_5}$, $O^{ACK_6}$, and $O^{ACK_7}$ each correspond to a 128-bit HARQ feedback payload size. $R_0$, $R_2$, and $R_5$ each correspond to a first PUCCH resource, $R_1$, $R_3$, and $R_6$ each correspond to a second PUCCH resource, and $R_4$ and $R_7$ both correspond to a third PUCCH resource. The embodiments are not limited to this example.

TABLE 10

| Bits in HFCI Field 418 | d | PUCCH Format | H.F.P. Size | PUCCH Resource |
|---|---|---|---|---|
| '000' | 0 | $F_0$ (PUCCH format 3) | $O^{ACK_0}$ (21 bits) | $R_0$ (1st PUCCH resource) |
| '001' | 1 | $F_1$ (PUCCH format 3) | $O^{ACK_1}$ (21 bits) | $R_1$ (2nd PUCCH resource) |
| '010' | 2 | $F_2$ (Enh. PUCCH format) | $O^{ACK_2}$ (64 bits) | $R_2$ (1st PUCCH resource) |
| '011' | 3 | $F_3$ (Enh. PUCCH format) | $O^{ACK_3}$ (64 bits) | $R_3$ (2nd PUCCH resource) |
| '100' | 4 | $F_4$ (Enh. PUCCH format) | $O^{ACK_4}$ (64 bits) | $R_4$ (3rd PUCCH resource) |
| '101' | 5 | $F_5$ (Enh. PUCCH format) | $O^{ACK_5}$ (128 bits) | $R_5$ (1st PUCCH resource) |
| '110' | 6 | $F_6$ (Enh. PUCCH format) | $O^{ACK_6}$ (128 bits) | $R_6$ (2nd PUCCH resource) |
| '111' | 7 | $F_7$ (Enh. PUCCH format) | $O^{ACK_7}$ (128 bits) | $R_7$ (3rd PUCCH resource) |

In some embodiments, a conventional field within DL scheduling command 206 may be repurposed for use as HFCI field 418. In various embodiments, for example a 2-bit TPC field in DL scheduling command 206 may be used as a 2-bit HFCI field 418. In some such embodiments, such repurposing of TPC fields as 2-bit HFCI fields may be limited to TPC fields comprised in PDCCH assignments with DAI values greater than '1' or DAI values equal to '1' that are not the first PDCCH transmissions on the primary cell and TPC fields comprised in DCI of the corresponding PDCCH detected on the secondary cell. The embodiments are not limited in this context.

In various embodiments, rather than being repurposed for use as HFCI field 418, a conventional field within DL scheduling command 206 may be repurposed for use in combination with HFCI field 418 in conjunction with the indication of one or more HARQ feedback configuration parameters. For example, in some embodiments, the collective set of bits comprised in HFCI field 418 and a TPC field may indicate one or more of a PUCCH format, a PUCCH resource, and a HARQ feedback payload size. In various embodiments, the repurposed field may be used to independently specify one or more HARQ feedback configuration parameters. For example, in some embodiments, the TPC field may be used to indicate a PUCCH format, and HFCI field 418 may be used to indicate a PUCCH resource and a HARQ feedback payload size. In various other embodiments, HFCI field 418 and the repurposed field may be used to provide bits to be combined to obtain a bit string that maps to a particular set of HARQ feedback configuration parameters. For example, in some embodiments, UE 104 may obtain a bit string by concatenation the bits in HFCI field 418 with the bits in the TPC field, and may determine a set of HARQ feedback configuration parameters according to a value-to-parameter mapping of the general form illustrated in Table 9. The embodiments are not limited in this context.

In various embodiments, UE 104 may generate HARQ feedback 214 according to a HARQ feedback generation process that implements a cell-group-based approach to HARQ feedback payload size adaptation. In some embodiments, according to such an approach, the various configured DL component carriers may be divided into multiple HARQ feedback cell groups (CGs). In various such embodiments, the number of CGs may be an integer power of 2 and/or each CG may comprise a same number of component carriers. In some embodiments, each CG may be assigned a unique CG identifier (ID). In various embodiments, HFCI field 418 may comprise a bitmap that includes, for each of the multiple CGs, a respective bit that indicates whether a PDSCH transmission or SPS release is scheduled on at least one DL component carrier of that CG during the HARQ feedback bundling window. In some embodiments, UE 104 may determine a HARQ feedback payload size based on such a bitmap comprised in HFCI field 418.

In various embodiments, for each CG for which a PDSCH transmission or SPS release is scheduled on at least one DL component carrier during the HARQ feedback bundling window, UE 104 may generate a pre-defined number of HARQ feedback bits. In some embodiments, if the component carriers correspond to FDD cells, UE 104 may a number of HARQ feedback bits equal to the number of component carriers comprised in the CG. In various embodiments, if the component carriers correspond to TDD cells, UE 104 may generate a number of HARQ feedback bits equal to the total number of subframes comprised within the HARQ feedback bundling window. In some embodiments, UE 104 may refrain from generating HARQ feedback bits for any CG with respect to which neither a PDSCH transmission nor an SPS release is scheduled on any component carrier during the HARQ feedback bundling window.

Figure 5:
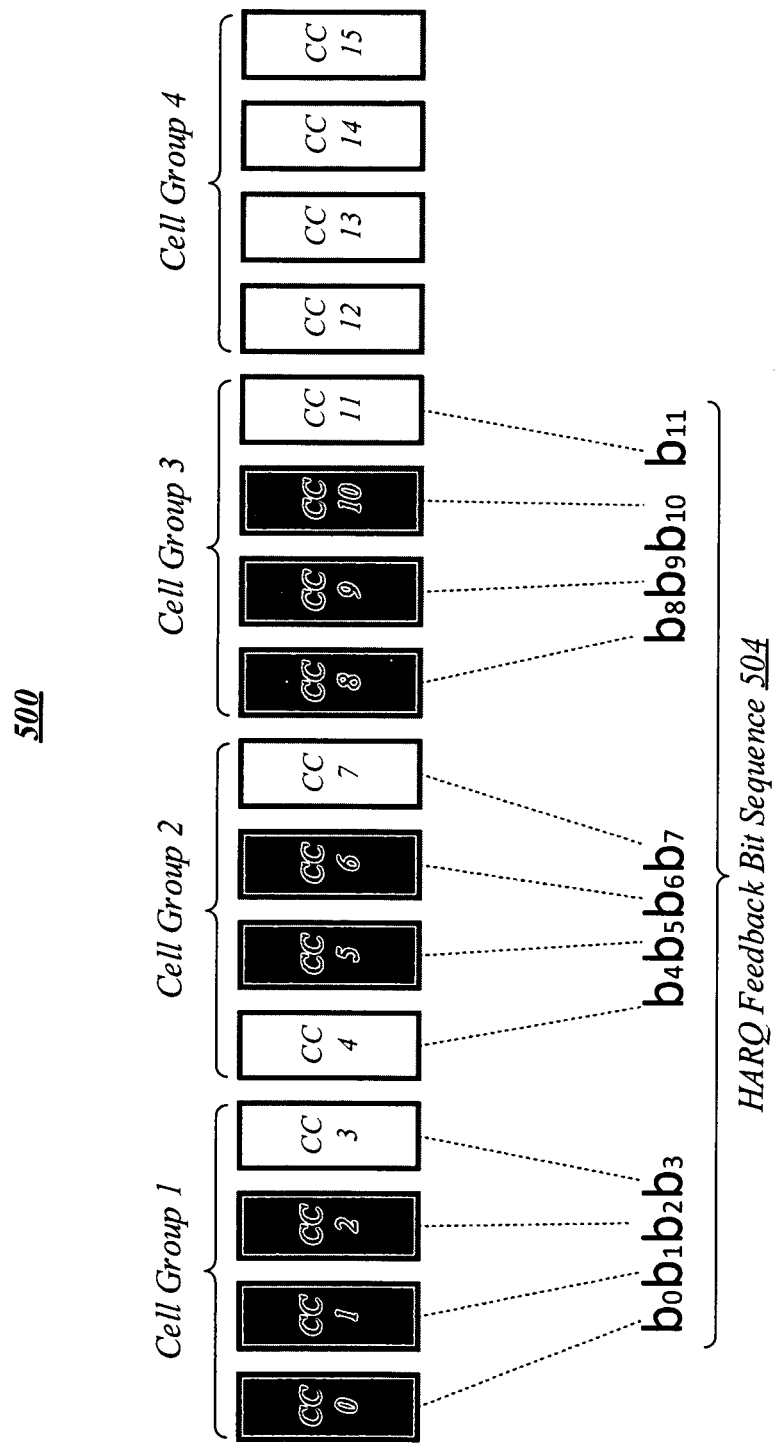
FIG. 5 illustrates an embodiment of a second feedback generation process.

FIG. 5 illustrates an example of a HARQ feedback generation process 500 that may be representative of a CG-based HARQ feedback generation process. In various embodiments, UE 104 may perform the HARQ feedback generation process illustrated in FIG. 5 in response to receipt of a DL scheduling command 206 in which HFCI field 418 contains the bitmap '1110'. In some embodiments, based on such a bitmap, UE 104 may determine that HARQ feedback bits are to be generated for CGs 1, 2, and 3, but not for CG 4. Each of CGs 1, 2, 3, and 4 comprises four respective component carriers. In this example, these various component carriers may correspond to FDD cells, and thus UE 104 may generate four respective HARQ feedback bits for each of CGs 1, 2, and 3, and assemble those various HARQ feedback bits into a 12-bit HARQ feedback bit sequence 504. In various embodiments, UE 104 may select a PUCCH format for use in transmission of HARQ feedback 214 based on the size of HARQ feedback bit sequence 504. In some embodiments, if the DAI field exists, the HARQ feedback payload can be further compressed according to the value of the DAI field with respect to each CG for which HARQ feedback bits are generated. The embodiments are not limited in this context.

In various embodiments, in conjunction with any of the various aforementioned approaches, UE 104 may be configured to autonomously select and use PUCCH format 1a/1b and a corresponding PUCCH resource to transmit HARQ feedback 214 under certain circumstances. In some embodiments, for example, UE 104 may be configured to autonomously select and use PUCCH format 1a/1b and a corresponding PUCCH resource when received DCI indicates only a PDSCH transmission or SPS release in the primary cell during the HARQ-ACK bundling window. In various such embodiments, the corresponding PUCCH resource may be Jo determined according to the lowest control channel element (CCE) index used to construct the PDCCH. In some embodiments, UE 104 may be configured to autonomously select and use PUCCH format 1a/1b and a corresponding PUCCH resource to transmit HARQ feedback for a primary cell PDSCH transmission during a subframe of the HARQ feedback bundling window for which no corresponding PDCCH/EPDCCH transmission is detected within that subframe. In various such embodiments, UE 104 may select the corresponding PUCCH resource from among four PUCCH resource values configured by higher layers, based on the value comprised in a TPC command for PUCCH field in DCI used to indicate a semi-persistent DL scheduling activation. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
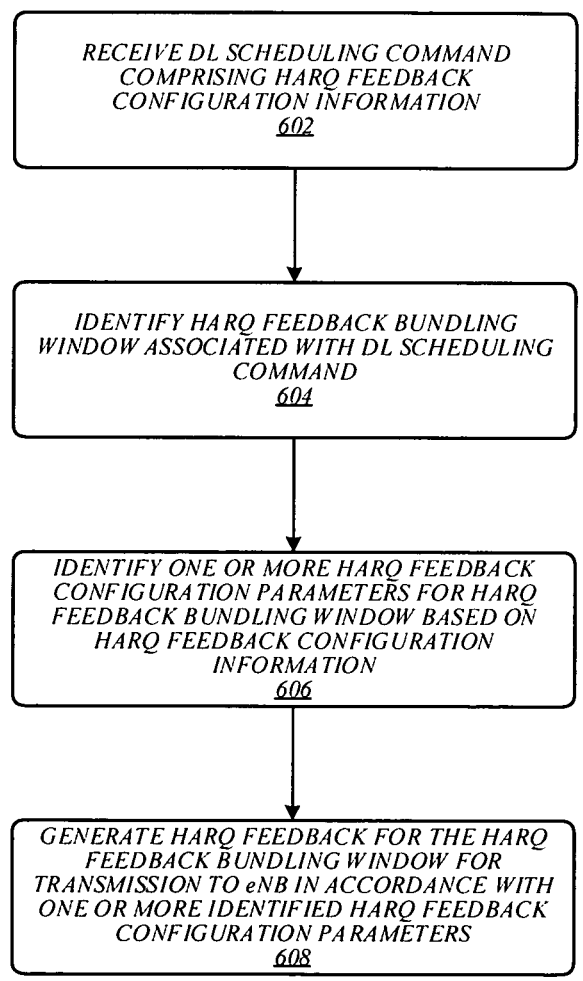
FIG. 6 illustrates an embodiment of a first logic flow.

FIG. 6 illustrates an example of a logic flow 600 that may be representative of the implementation of one or more of the disclosed HARQ feedback configuration techniques according to various embodiments. For example, logic flow 600 may be representative of operations that may be performed in some embodiments by UE 104 in operating environment 200 of FIG. 2 or operating environment 400 of FIG. 4. As shown in FIG. 6, a DL scheduling command may be received at 602 that comprises HARQ feedback configuration information. For example, UE 104 may receive a DL scheduling command 206 from eNB 102, and the DL scheduling command 206 may comprise an HFCI field 218 or HFCI field 418 containing HARQ feedback configuration information. At 604, a HARQ feedback bundling window associated with the DL scheduling command may be identified. For example, UE 104 may identify a HARQ feedback bundling window associated with DL scheduling command 206.

At 606, one or more HARQ feedback configuration parameters for the HARQ feedback bundling window may be identified based on the HARQ feedback configuration information. For example, HARQ feedback 214 may comprise HARQ feedback for a HARQ feedback bundling window, and UE 104 may identify one or more of a PUCCH format to be used for transmission of HARQ feedback 214, a PUCCH resource for use in transmission of HARQ feedback 214, and a HARQ feedback payload size for HARQ feedback 214 based on HARQ feedback configuration information comprised in HFCI field 218 or HFCI field 418. At 608, HARQ feedback for the HARQ feedback bundling window may be generated for transmission to an eNB in accordance with the one or more identified HARQ feedback configuration parameters. For example, UE 104 may generate HARQ feedback 214 for transmission to eNB 102 in accordance with the one or more HARQ feedback configuration parameters identified at 606. The embodiments are not limited to these examples.

Figure 7:
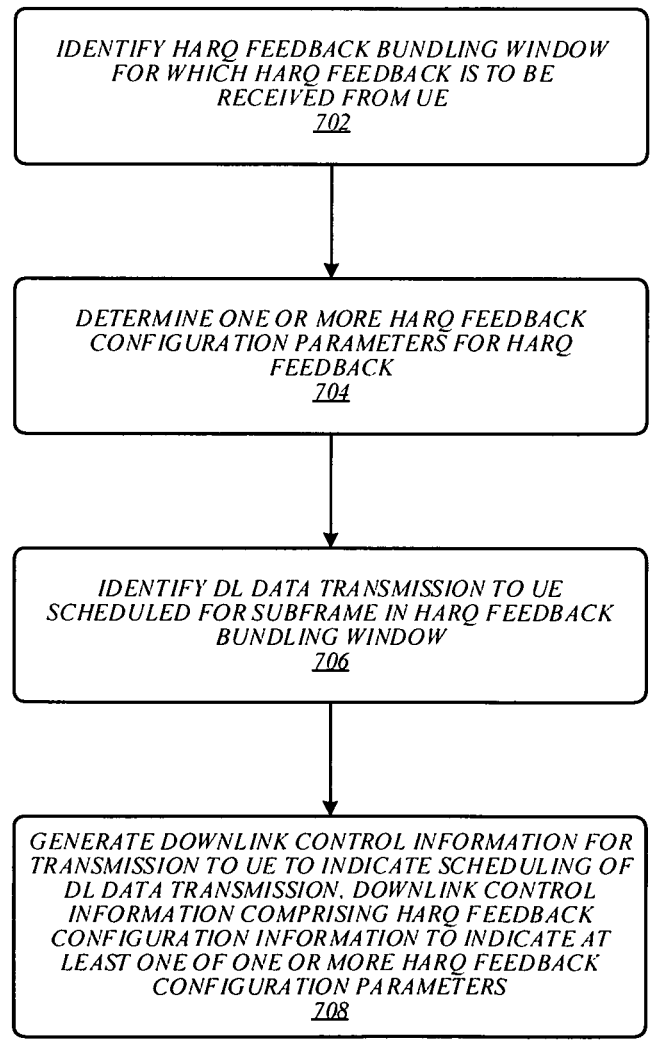
FIG. 7 illustrates an embodiment of a second logic flow.

FIG. 7 illustrates an example of a logic flow 700 that may be representative of the implementation of one or more of the disclosed HARQ feedback configuration techniques according to various embodiments. For example, logic flow 700 may be representative of operations that may be performed in some embodiments by eNB 102 in operating environment 200 of FIG. 2 or operating environment 400 of FIG. 4. As shown in FIG. 7, a HARQ feedback bundling window for which HARQ feedback is to be received from a UE may be identified at 702. For example, eNB 102 may identify a HARQ feedback bundling window for which it is to receive HARQ feedback 214 from UE 104. At 704, one or more HARQ feedback configuration parameters for the HARQ feedback may be determined. For example, eNB 102 may determine one or more of a PUCCH format to be used by UE 104 for transmission of HARQ feedback 214, a PUCCH resource to be used by UE 104 in transmission of HARQ feedback 214, and a HARQ feedback payload size to be used by UE 104 for HARQ feedback 214.

At 706, a DL data transmission to the UE that is scheduled for a subframe in the HARQ feedback bundling window may be identified. For example, eNB 102 may identify a DL transmission of data 210 to UE 104 that is scheduled for a subframe comprised in the HARQ feedback bundling window. At 708, downlink control information may be generated for transmission to the UE to indicate the scheduling of the DL data transmission, and the downlink control information may comprise HARQ feedback configuration information to indicate at least one of the one or more HARQ feedback configuration parameters determined at 704. For example, eNB 102 may generate a DL scheduling command 206 for transmission to UE 104 to indicate the scheduling of the DL transmission of data 210 to UE 104 during the subframe comprised in the HARQ feedback bundling window, and DL scheduling command 206 may comprise an HFCI field 218 or HFCI field 418 containing HARQ feedback configuration information that indicates one or more of a PUCCH format to be used by UE 104 for transmission of HARQ feedback 214, a PUCCH resource to be used by UE 104 in transmission of HARQ feedback 214, and a HARQ feedback payload size to be used by UE 104 for HARQ feedback 214. The embodiments are not limited to these examples.

FIG. 8 illustrates an embodiment of a storage medium 800 and an embodiment of a storage medium 850. Storage media 800 and 850 may comprise any non-transitory computer-readable storage media or machine-readable storage media, such as an optical, magnetic or semiconductor storage media. In various embodiments, storage media 800 and 850 may comprise an article of manufacture. In some embodiments, storage media 800 and 850 may store computer-executable instructions, such as computer-executable instructions to implement logic flow 600 of FIG. 6 and logic flow 700 of FIG. 7, respectively. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 9:
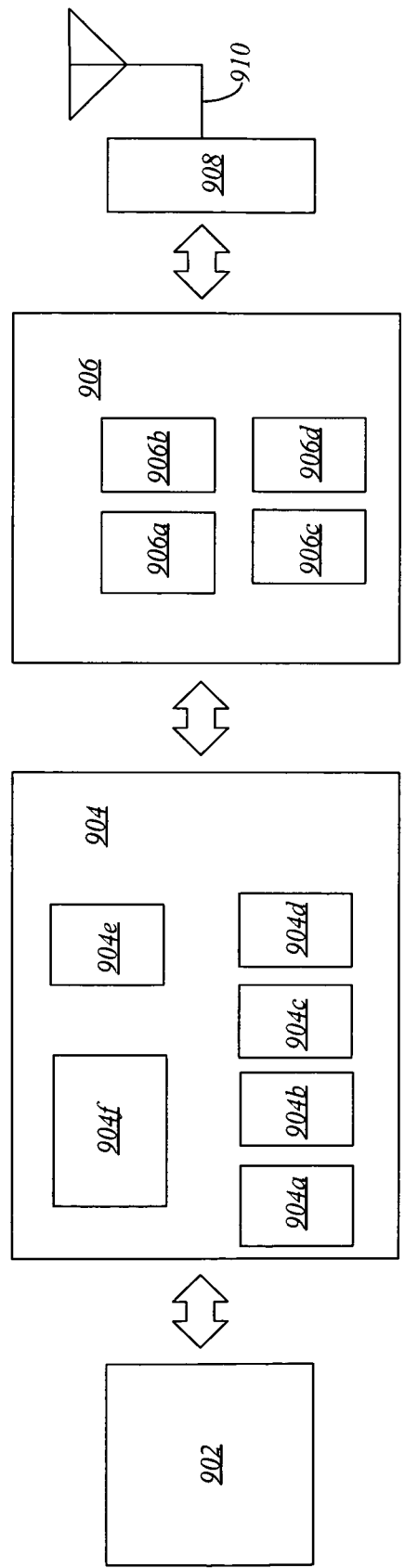
FIG. 9 illustrates an embodiment of a first device.

FIG. 9 illustrates an example of a UE device 900 that may be representative of a UE that implements one or more of the disclosed techniques in various embodiments. For example, UE device 900 may be representative of UE 104 according to some embodiments. In some embodiments, the UE device 900 may include application circuitry 902, baseband circuitry 904, Radio Frequency (RF) circuitry 906, front-end module (FEM) circuitry 908 and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE device 900 may include additional elements such as, for example, memory/storage, display, camera, sensor, and/or input/output (I/O) interface.

Figure 10:
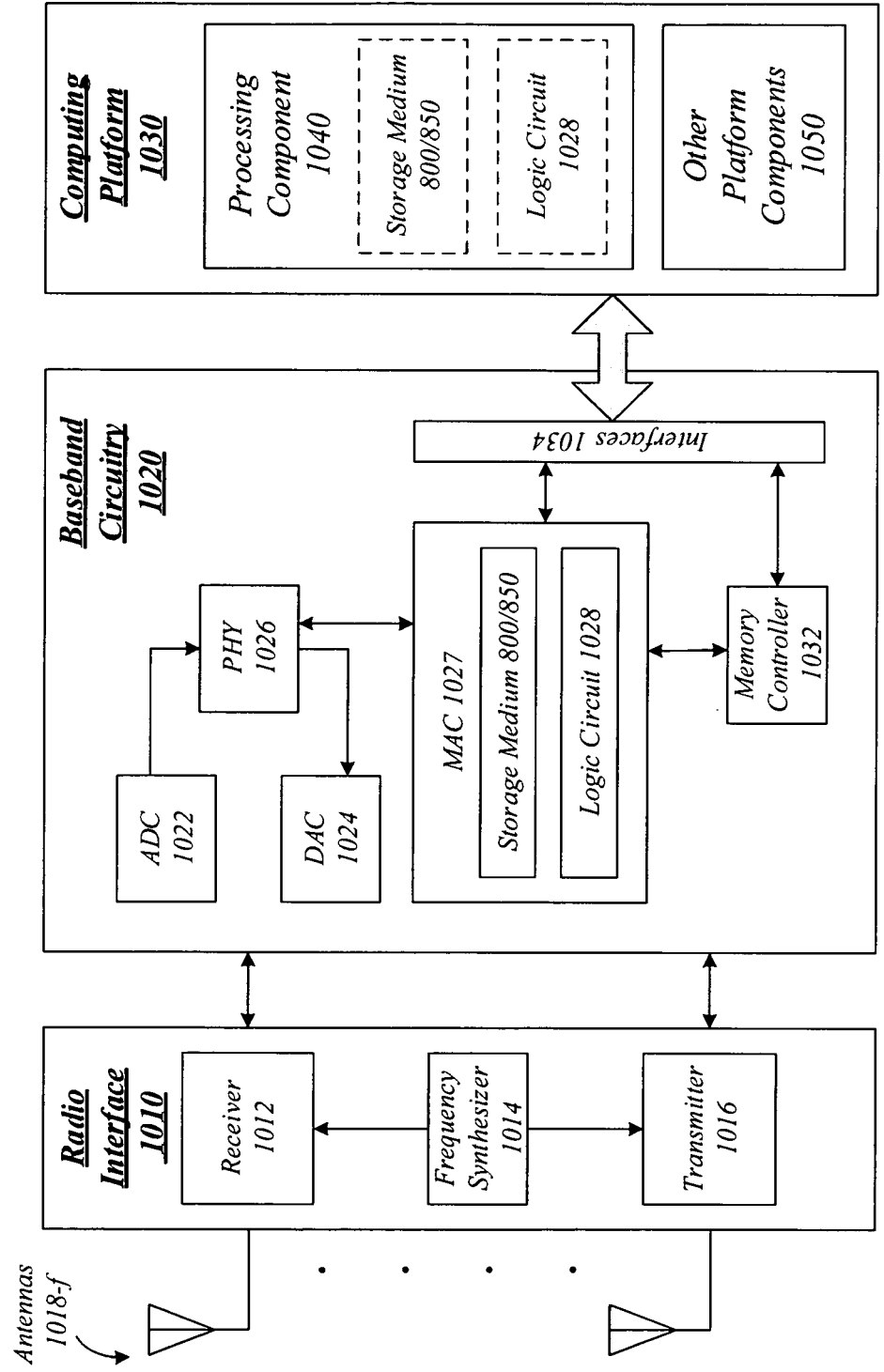
FIG. 10 illustrates an embodiment of a second device.

FIG. 10 illustrates an embodiment of a communications device 1000 that may implement one or more of eNB 102, UE 104, logic flow 600, logic flow 700, storage medium 800, storage medium 850, and UE 900. In various embodiments, device 1000 may comprise a logic circuit 1028. The logic circuit 1028 may include physical circuits to perform operations described for one or more of eNB 102, UE 104, logic flow 600, logic flow 700, and UE 900 of FIG. 9 for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of eNB 102, UE 104, logic flow 600, logic flow 700, storage medium 800, storage medium 850, UE 900, and logic circuit 1028 in a single computing entity, such as entirely within a single device. Alternatively, the device 1000 may distribute portions of the structure and/or operations for one or more of eNB 102, UE 104, logic flow 600, logic flow 700, storage medium 800, storage medium 850, UE 900, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, a mixer for down-converting received RF signals, an analog-to-digital converter 1022 for converting analog signals to digital form, a digital-to-analog converter 1024 for converting digital signals to analog form, and a mixer for up-converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of eNB 102, UE 104, logic flow 600, logic flow 700, storage medium 800, storage medium 850, UE 900, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
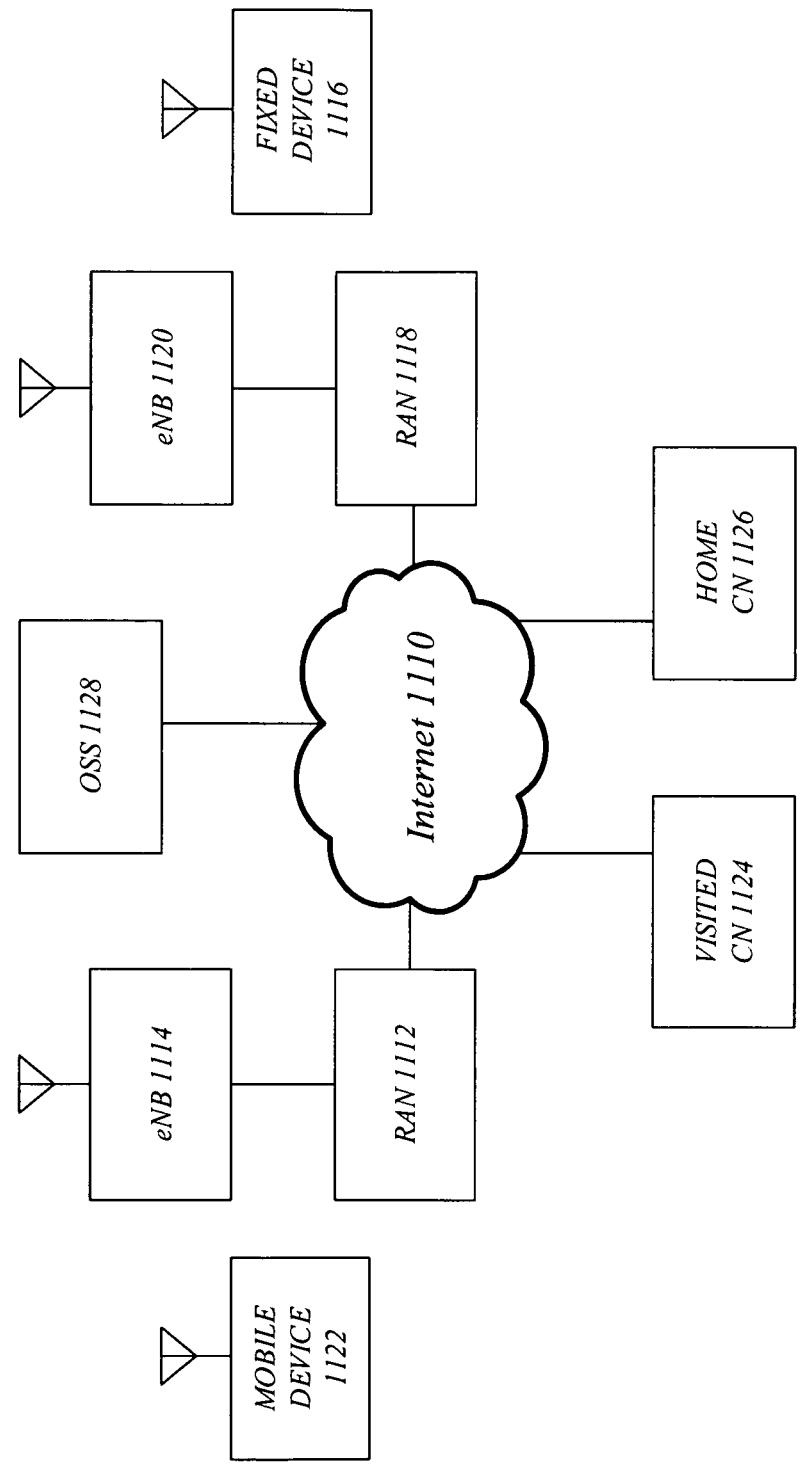
FIG. 11 illustrates an embodiment of a wireless network.

FIG. 11 illustrates an embodiment of a broadband wireless access system 1100. As shown in FIG. 11, broadband wireless access system 1100 may be an internet protocol (IP) type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1100, radio access networks (RANs) 1112 and 1118 are capable of coupling with evolved node Bs (eNBs) 1114 and 1120, respectively, to provide wireless communication between one or more fixed devices 1116 and internet 1110 and/or between or one or more mobile devices 1122 and Internet 1110. One example of a fixed device 1116 and a mobile device 1122 is device 1000 of FIG. 10, with the fixed device 1116 comprising a stationary version of device 1000 and the mobile device 1122 comprising a mobile version of device 1000. RANs 1112 and 1118 may implement profiles that are capable of defining the mapping of network functions to one or more physical entities on broadband wireless access system 1100. eNBs 1114 and 1120 may comprise radio equipment to provide RF communication with fixed device 1116 and/or mobile device 1122, such as described with reference to device 1000, and may comprise, for example, the PHY and MAC layer equipment in compliance with a 3GPP LTE Specification or an IEEE 802.16 Standard. eNBs 1114 and 1120 may further comprise an IP backplane to couple to Internet 1110 via RANs 1112 and 1118, respectively, although the scope of the claimed subject matter is not limited in these respects.

Broadband wireless access system 1100 may further comprise a visited core network (CN) 1124 and/or a home CN 1126, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1124 and/or home CN 1126, and the scope of the claimed subject matter is not limited in these respects. Visited CN 1124 may be referred to as a visited CN in the case where visited CN 1124 is not part of the regular service provider of fixed device 1116 or mobile device 1122, for example where fixed device 1116 or mobile device 1122 is roaming away from its respective home CN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122. The embodiments are not limited in this context.

Fixed device 1116 may be located anywhere within range of one or both of eNBs 1114 and 1120, such as in or near a home or business to provide home or business customer broadband access to Internet 1110 via eNBs 1114 and 1120 and RANs 1112 and 1118, respectively, and home CN 1126. It is worthy of note that although fixed device 1116 is generally disposed in a stationary location, it may be moved to different locations as needed. Mobile device 1122 may be utilized at one or more locations if mobile device 1122 is within range of one or both of eNBs 1114 and 1120, for example. In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory, and logic for user equipment (UE), at least a portion of the logic implemented in circuitry coupled to the memory, the logic to identify a hybrid automatic repeat request (HARQ) bundling window associated with a received downlink (DL) scheduling command, identify one or more HARQ feedback configuration parameters based on HARQ feedback configuration information comprised in the DL scheduling command, the one or more identified HARQ feedback configuration parameters to include a physical uplink control channel (PUCCH) format for use in transmission of HARQ feedback for the HARQ feedback bundling window, and generate the HARQ feedback for transmission to an evolved node B (eNB) according to the PUCCH format.

Example 2 is the apparatus of Example 1, the logic to identify a PUCCH resource based on the PUCCH format, and generate the HARQ feedback for transmission to the eNB according to the PUCCH format and the PUCCH resource.

Example 3 is the apparatus of any of Examples 1 to 2, the HARQ feedback configuration information to indicate a PUCCH resource for use in transmission of the HARQ feedback.

Example 4 is the apparatus of any of Examples 1 to 3, the HARQ feedback configuration information to indicate a HARQ feedback payload size for the HARQ feedback.

Example 5 is the apparatus of any of Examples 1 to 4, the HARQ feedback configuration information to comprise one bit.

Example 6 is the apparatus of any of Examples 1 to 4, the HARQ feedback configuration information to comprise multiple bits.

Example 7 is the apparatus of Example 6, the HARQ feedback configuration information to comprise a bit string that indicates a particular set of two or more HARQ feedback configuration parameters.

Example 8 is the apparatus of any of Examples 1 to 7, the logic to generate the HARQ feedback for transmission to the eNB via a PUCCH of a primary cell of the UE.

Example 9 is a system, comprising an apparatus according to any of Examples 1 to 8, and at least one radio frequency (RF) transceiver, at least one RF antenna.

Example 10 is a method, comprising identifying, by circuitry at an evolved node B (eNB), a hybrid automatic repeat request (HARQ) feedback bundling window for which HARQ feedback is to be received from user equipment (UE), determining one or more HARQ feedback configuration parameters for the HARQ feedback, and generating downlink control information (DCI) for transmission to the UE to indicate a scheduling of a downlink (DL) data transmission to the UE for a subframe comprised in the HARQ feedback bundling window, the DCI to comprise HARQ feedback configuration information indicating at least one of the one or more HARQ feedback configuration parameters.

Example 11 is the method of Example 10, the HARQ feedback configuration information to indicate a physical uplink control channel (PUCCH) format for the HARQ feedback.

Example 12 is the method of any of Examples 10 to 11, the HARQ feedback configuration information to indicate a physical uplink control channel (PUCCH) resource for the HARQ feedback.

Example 13 is the method of any of Examples 10 to 12, the HARQ feedback configuration information to indicate a HARQ feedback payload size for the HARQ feedback.

Example 14 is the method of any of Examples 10 to 13, the HARQ feedback configuration information to comprise a value of a one-bit field of the DCI.

Example 15 is the method of any of Examples 10 to 13, the HARQ feedback configuration information to comprise a value of a multi-bit field of the DCI.

Example 16 is the method of any of Examples 10 to 15, the DCI to comprise a DL scheduling command.

Example 17 is the method of any of Examples 10 to 16, comprising generating the DCI for transmission to the UE over a physical downlink control channel (PDCCH) or an enhanced physical downlink control channel (EPDCCH).

Example 18 is at least one computer-readable storage medium comprising a set of instructions that, in response to being executed on a computing device, cause the computing device to perform a method according to any of Examples 10 to 17.

Example 19 is an apparatus, comprising means for performing a method according to any of Examples 10 to 17.

Example 20 is a system, comprising the apparatus of Example 19, at least one radio frequency (RF) transceiver, and at least one RF antenna.

Example 21. User equipment (UE), comprising logic, at least a portion of which is in circuitry, the logic to identify a value of a hybrid automatic repeat request (HARQ) feedback configuration information (HFCI) field comprised in a received downlink (DL) scheduling command, determine a physical uplink control channel (PUCCH) format, a PUCCH resource, and a HARQ feedback payload size for use in providing HARQ feedback for a HARQ bundling window associated with the DL scheduling command, at least one of the PUCCH format, the PUCCH resource, and the HARQ feedback payload size to be determined based on the value of the HFCI field, and generate the HARQ feedback according to the HARQ feedback payload size, and a radio frequency (RF) transceiver coupled to the circuitry, the RF transceiver to transmit the HARQ feedback over a PUCCH using the PUCCH resource, according to the PUCCH format.

Example 22 is the UE of Example 21, the PUCCH to comprise a PUCCH of a primary cell of the UE.

Example 23 is the UE of any of Examples 21 to 22, the logic to determine at least the Jo PUCCH format based on the value of the HFCI field.

Example 24 is the UE of any of Examples 21 to 23, the logic to determine at least the PUCCH resource based on the value of the HFCI field.

Example 25 is the UE of any of Examples 21 to 24, the logic to determine at least the HARQ feedback payload size based on the value of the HFCI field.

Example 26 is the UE of any of Examples 21 to 25, the logic to determine two or more of the PUCCH format, the PUCCH resource, and the HARQ feedback payload size based on the value of the HFCI field.

Example 27 is the UE of any of Examples 21 to 26, the HFCI field to comprise a one-bit indicator.

Example 28 is the UE of any of Examples 21 to 26, the HFCI field to comprise a multi-bit indicator.

Example 29 is the UE of any of Examples 21 to 28, comprising a touchscreen display.

Example 30 is an apparatus, comprising a memory, and logic for an evolved node B (eNB), at least a portion of the logic implemented in circuitry coupled to the memory, the logic to identify a hybrid automatic repeat request (HARQ) feedback bundling window for which HARQ feedback is to be received from user equipment (UE), determine one or more HARQ feedback configuration parameters for the HARQ feedback, and generate downlink control information (DCI) for transmission to the UE to indicate a scheduling of a downlink (DL) data transmission to the UE for a subframe comprised in the HARQ feedback bundling window, the DCI to comprise HARQ feedback configuration information indicating at least one of the one or more HARQ feedback configuration parameters.

Example 31 is the apparatus of Example 30, the HARQ feedback configuration information to indicate a physical uplink control channel (PUCCH) format for the HARQ feedback.

Example 32 is the apparatus of any of Examples 30 to 31, the HARQ feedback configuration information to indicate a physical uplink control channel (PUCCH) resource for the HARQ feedback.

Example 33 is the apparatus of any of Examples 30 to 32, the HARQ feedback configuration information to indicate a HARQ feedback payload size for the HARQ feedback.

Example 34 is the apparatus of any of Examples 30 to 33, the HARQ feedback configuration information to comprise a value of a one-bit field of the DCI.

Example 35 is the apparatus of any of Examples 30 to 33, the HARQ feedback configuration information to comprise a value of a multi-bit field of the DCI.

Example 36 is the apparatus of any of Examples 30 to 35, the DCI to comprise a DL scheduling command.

Example 37 is the apparatus of any of Examples 30 to 36, the logic to generate the DCI for transmission to the UE over a physical downlink control channel (PDCCH) or an enhanced physical downlink control channel (EPDCCH).

Example 38 is a system, comprising an apparatus according to any of Examples 30 to 37, at least one radio frequency (RF) transceiver, and at least one RF antenna.

Example 39 is a method, comprising identifying, by circuitry at user equipment (UE), a hybrid automatic repeat request (HARQ) bundling window associated with a received downlink (DL) scheduling command, identifying one or more HARQ feedback configuration parameters based on HARQ feedback configuration information comprised in the DL scheduling command, the one or more identified HARQ feedback configuration parameters to include a physical uplink control channel (PUCCH) format for use in transmission of HARQ feedback for the HARQ feedback bundling window, and generating the HARQ feedback for transmission to an evolved node B (eNB) according to the PUCCH format.

Example 40 is the method of Example 39, the logic to identifying a PUCCH resource based on the PUCCH format, and generating the HARQ feedback for transmission to the eNB according to the PUCCH format and the PUCCH resource.

Example 41 is the method of any of Examples 39 to 40, the HARQ feedback configuration information to indicate a PUCCH resource for use in transmission of the HARQ feedback.

Example 42 is the method of any of Examples 39 to 41, the HARQ feedback configuration information to indicate a HARQ feedback payload size for the HARQ feedback.

Example 43 is the method of any of Examples 39 to 42, the HARQ feedback configuration information to comprise one bit.

Example 44 is the method of any of Examples 39 to 42, the HARQ feedback configuration information to comprise multiple bits.

Example 45 is the method of Example 44, the HARQ feedback configuration information to comprise a bit string that indicates a particular set of two or more HARQ feedback configuration parameters.

Example 46 is the method of any of Examples 39 to 45, comprising generating the HARQ feedback for transmission to the eNB via a PUCCH of a primary cell of the UE.

Example 47 is at least one computer-readable storage medium comprising a set of instructions that, in response to being executed on a computing device, cause the computing device to perform a method according to any of Examples 39 to 46.

Example 48 is an apparatus, comprising means for performing a method according to any of Examples 39 to 46.

Example 49 is a system, comprising the apparatus of Example 48, at least one radio frequency (RF) transceiver, and at least one RF antenna.

Example 50 is the system of Example 49, comprising a touchscreen display.

Example 51 is a method, comprising identifying, by circuitry at user equipment (UE), a value of a hybrid automatic repeat request (HARQ) feedback configuration information (HFCI) field comprised in a received downlink (DL) scheduling command, determining a physical uplink control channel (PUCCH) format, a PUCCH resource, and a HARQ feedback payload size for use in providing HARQ feedback for a HARQ bundling window associated with the DL scheduling command, at least one of the PUCCH format, the PUCCH resource, and the HARQ feedback payload size to be determined based on the value of the HFCI field, generating the HARQ feedback according to the HARQ feedback payload size, and transmitting the HARQ feedback over a PUCCH using the PUCCH resource, according to the PUCCH format.

Example 52 is the method of Example 51, the PUCCH to comprise a PUCCH of a primary cell of the UE.

Example 53 is the method of any of Examples 51 to 52, comprising determining at least the PUCCH format based on the value of the HFCI field.

Example 54 is the method of any of Examples 51 to 53, comprising determining at least the PUCCH resource based on the value of the HFCI field.

Example 55 is the method of any of Examples 51 to 54, comprising determining at least the HARQ feedback payload size based on the value of the HFCI field.

Example 56 is the method of any of Examples 51 to 55, comprising determining two or more of the PUCCH format, the PUCCH resource, and the HARQ feedback payload size based on the value of the HFCI field.

Example 57 is the method of any of Examples 51 to 56, the HFCI field to comprise a one-bit indicator.

Example 58 is the method of any of Examples 51 to 56, the HFCI field to comprise a multi-bit indicator.

Example 59 is at least one computer-readable storage medium comprising a set of instructions that, in response to being executed on a computing device, cause the computing device to perform a method according to any of Examples 51 to 58.

Example 60 is an apparatus, comprising means for performing a method according to any of Examples 51 to 58.

Example 61 is a system, comprising the apparatus of Example 60, at least one radio frequency (RF) transceiver, and at least one RF antenna.

Example 62 is the system of Example 61, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory; and
   logic for a user equipment (UE), at least a portion of the logic implemented in baseband circuitry coupled to the memory, the logic to:
   identify a value contained in downlink control information (DCI) received from a base station (BS) consisting of exactly two-bits,
   the value indicating a physical uplink control channel (PUCCH) format, a PUCCH resource, and a hybrid automatic repeat request (HARQ) feedback payload size for a HARQ feedback;
   determine a number of bits of HARQ feedback from the HARQ feedback payload size to be included in control information to be provided to the BS;
   determine whether a physical uplink control channel (PUCCH) format 3 can accommodate the number of bits of HARQ feedback; and
   in response to a determination that the PUCCH format 3 cannot accommodate the number of bits of HARQ feedback:
     generate the control information according to a second PUCCH format; and
     send the control information to radio frequency (RF) circuitry for transmission to the BS via the PUCCH resource identified based on the value.

2. The apparatus of claim 1, wherein the value is comprised in a transmit power control (TPC) field of the DCI.

3. The apparatus of claim 1, wherein the value contained in DCI received from the BS indicates the second PUCCH format, a third HARQ payload size, and a third PUCCH resource wherein the third HARQ payload size is greater than 21 bits.

4. The apparatus of claim 1, the logic to:
   identify a PUCCH resource value that corresponds to the value contained in the DCI; and
   identify the PUCCH resource based on the PUCCH resource value.

5. The apparatus of claim 1, wherein the HARQ feedback comprises feedback for downlink (DL) data transmissions to the UE via a plurality of aggregated component carriers.

6. The apparatus of claim 1, the logic to determine that the PUCCH format 3 cannot accommodate the number of bits of HARQ feedback when the number of bits of HARQ feedback exceeds 21 bits.

7. The apparatus of claim 1, the logic to:
   in response to a determination that the PUCCH format 3 can accommodate the number of bits of HARQ feedback, generate the control information according to the PUCCH format 3, for transmission to the BS via a PUCCH resource identified based on a value contained in downlink control information (DCI) received from the BS.

8. The apparatus of claim 1, the logic to generate the control information for transmission to the BS via a PUCCH of a primary cell of the UE.

9. The apparatus of claim 1, comprising radio frequency (RF) circuitry coupled to the baseband circuitry, the RF circuitry to generate RF signals for transmission to the BS, the RF signals to comprise the control information.

10. An at least one non-transitory computer-readable storage medium comprising a set of instructions that, in response to being executed at a user equipment (UE), cause the UE to:
    identify a value contained in downlink control information (DCI) received from a base station (BS) consisting of exactly two-bits,
    the value indicating a physical uplink control channel (PUCCH) format, a PUCCH resource, and a HARQ feedback payload size for a HARQ feedback;
    identify hybrid automatic repeat request (HARQ) feedback to be provided to the BS via a physical uplink control channel (PUCCH) of a primary cell of the UE according to a PUCCH format that can accommodate a greater number of HARQ feedback bits than can be accommodated by a PUCCH format 3;
    determine, based on the value, a PUCCH resource to be used to provide the HARQ feedback; and
    generate control information according to the PUCCH format for transmission to the BS via the PUCCH resource, the control information to comprise the HARQ feedback.

11. The at least one non-transitory computer-readable storage medium of claim 10, the DCI to be received from the BS via a physical downlink control channel (PDCCH) or an enhanced physical downlink control channel (EPDCCH).

12. The at least one non-transitory computer-readable storage medium of claim 10, wherein a format of the DCI comprises one of a DCI format 1, a DCI format 1A, a DCI format 1 B, a DCI format 1 D, a DCI format 2, a DCI format 2A, a DCI format 2B, a DCI format 2C, and a DCI format 2D.

13. The at least one non-transitory computer-readable storage medium of claim 10, comprising instructions that, in response to being executed at the UE, cause the UE to determine that the HARQ feedback is to be provided according to the PUCCH format based on a number of bits to be comprised in the HARQ feedback.

14. The at least one non-transitory computer-readable storage medium of claim 13, comprising instructions that, in response to being executed at the UE, cause the UE to determine that the HARQ feedback is to be provided according to the PUCCH format based on a determination that the HARQ feedback is to comprise a number of bits that cannot be accommodated by the PUCCH format 3.

15. The at least one non-transitory computer-readable storage medium of claim 10, wherein the value contained in DCI received from the BS indicates a second PUCCH format, a third HARQ payload size, and a third PUCCH resource wherein the third HARQ payload size is greater than 21 bits.

16. The at least one non-transitory computer-readable storage medium of claim 15, wherein the two-bits are comprised in a transmit power control (TPC) field of the DCI.

17. The at least one non-transitory computer-readable storage medium of claim 16, wherein the HARQ feedback comprises feedback for data transmissions over multiple aggregated carriers.

18. A User equipment (UE), comprising:
baseband circuitry to generate baseband signals comprising control information to be provided to a base station (BS), the baseband circuitry to:
identify a set of downlink data transmissions for which to include hybrid automatic repeat request (HARQ) feedback in the control information, the set of downlink data transmissions to comprise transmissions via two or more aggregated carriers; and
identify a value contained in downlink control information (DCI) received from the BS consisting of exactly two-bits,
the value indicating a physical uplink control channel (PUCCH) format, a PUCCH resource, and a HARQ feedback payload size for a HARQ feedback;
based on a determination that a number of bits of the HARQ feedback payload size to be comprised in the HARQ feedback exceeds a number of HARQ feedback bits that can be accommodated by a physical uplink control channel (PUCCH) format 3:
construct the control information according to a second PUCCH format that can accommodate a greater number of HARQ feedback bits than can be accommodated by the PUCCH format 3; and
identify, based on the value, the PUCCH resource to provide the control information;
radio frequency (RF) circuitry to generate RF signals based on the baseband signals; and
circuitry to amplify the RF signals for transmission by at least one RF antenna.

19. The UE of claim 18, wherein the second PUCCH format comprises a PUCCH format 4 or a PUCCH format 5.

20. The UE of claim 18, wherein the value is comprised in a transmit power control (TPC) field of the DCI.

21. The UE of claim 18, wherein the value contained in DCI received from the BS indicates the second PUCCH format, a third HARQ payload size, and a third PUCCH resource wherein the third HARQ payload size is greater than 21 bits.

22. The UE of claim 18, wherein the PUCCH resource comprises a resource of a PUCCH of a primary cell of the UE.

23. The UE of claim 18, the DCI to be received from the BS via a physical downlink control channel (PDCCH) or an enhanced physical downlink control channel (EPDCCH).

24. The UE of claim 18, the baseband circuitry to determine that the PUCCH format 3 cannot accommodate the number of bits to be comprised in the HARQ feedback when the number of bits to be comprised in the HARQ feedback exceeds 21 bits.

25. The UE of claim 18, wherein a format of the DCI comprises one of a DCI format 1, a DCI format 1A, a DCI format 1 B, a DCI format 1 D, a DCI format 2, a DCI format 2A, a DCI format 2B, a DCI format 2C, and a DCI format 2D.

* * * * *